(12) United States Patent
Maier et al.

(10) Patent No.: US 7,977,394 B2
(45) Date of Patent: Jul. 12, 2011

(54) TRIBLOCK COPOLYMERS WITH ACIDIC GROUPS

(75) Inventors: Gerhard Maier, Munich (DE); Markus Gross, Kaufbeuren (DE); Hans-Georg Herz, Marktoberdorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 1671 days.

(21) Appl. No.: 11/120,710

(22) Filed: May 3, 2005

(65) Prior Publication Data

US 2006/0249444 A1    Nov. 9, 2006

(51) Int. Cl.
*B01J 41/00* (2006.01)
*B01J 43/00* (2006.01)

(52) U.S. Cl. ............................... 521/39; 521/27
(58) Field of Classification Search ............ 521/27, 521/39
See application file for complete search history.

(56) References Cited

U.S. PATENT DOCUMENTS

| | | | |
|---|---|---|---|
| 4,331,746 A | 5/1982 | Sheibley | |
| 5,468,574 A | 11/1995 | Ehrenberg et al. | |
| 5,677,074 A | 10/1997 | Serpico et al. | |
| 6,579,948 B1 | 6/2003 | Tan et al. | |
| 6,630,265 B1 | 10/2003 | Taft, III et al. | |
| 6,761,989 B2 | 7/2004 | Terahara et al. | |
| 2001/0041279 A1 | 11/2001 | Terahara | |
| 2002/0155333 A1 | 10/2002 | Fitts et al. | |
| 2002/0160271 A1 | 10/2002 | Frech et al. | |
| 2002/0187377 A1 | 12/2002 | Shinoda et al. | |
| 2003/0013817 A1 | 1/2003 | Lu | |
| 2003/0031911 A1 | 2/2003 | Ritts et al. | |
| 2003/0044669 A1 | 3/2003 | Hidaka et al. | |
| 2003/0049511 A1 | 3/2003 | Ritts et al. | |
| 2003/0104280 A1 | 6/2003 | Venkatesan et al. | |
| 2003/0198858 A1 | 10/2003 | Sun et al. | |
| 2003/0219640 A1 | 11/2003 | Nam et al. | |
| 2003/0222048 A1 | 12/2003 | Asakawa et al. | |
| 2004/0005474 A1 | 1/2004 | Charnock et al. | |
| 2004/0005490 A1 | 1/2004 | Fan et al. | |
| 2004/0038107 A1 | 2/2004 | Fan et al. | |
| 2004/0050816 A1 | 3/2004 | Asakawa et al. | |

(Continued)

FOREIGN PATENT DOCUMENTS

CA    2 393 241 A1    1/2003

(Continued)

OTHER PUBLICATIONS

Xing, P.; Robertson, G. P.; Guiver, M. D.; Mikhailenko, S. D.; Kaliaguine, S. "Synthesis and characterization of poly(aryl ether ketone) copolymers containing (hexafluoroisopropylidene)-diphenol moiety as proton exchange membrane materials." Polymer vol. 46, Issue 10, pp. 3257-3263. available online at sciencedirect.com Mar. 23, 2005.*

(Continued)

*Primary Examiner* — Mark Eashoo
*Assistant Examiner* — Megan McCulley
(74) *Attorney, Agent, or Firm* — Brooks Kushman P.C.

(57) ABSTRACT

Triblock copolymers useful for forming ion conductive membranes are provided. The triblock copolymers are characterized by having either a hydrophobic-hydrophilic-hydrophobic or a hydrophilic-hydrophobic-hydrophilic polymer sequence that induces a microphase separated morphology. Variations in which the hydrophilic polymer sequence component includes either acid groups or salts of acid groups are also disclosed. Methods for forming an ion conductive membrane from the triblock copolymers are provided.

12 Claims, 1 Drawing Sheet

U.S. PATENT DOCUMENTS

| | | |
|---|---|---|
| 2004/0101730 A1 | 5/2004 | Hirano et al. |
| 2004/0126666 A1 | 7/2004 | Cao et al. |
| 2004/0138387 A1 | 7/2004 | Terahara et al. |
| 2004/0186262 A1 | 9/2004 | Maier et al. |
| 2004/0202908 A1 | 10/2004 | Schmitz et al. |

FOREIGN PATENT DOCUMENTS

| | | |
|---|---|---|
| CA | 2 415 355 A1 | 1/2003 |
| CA | 2 470 123 A1 | 6/2003 |
| CA | 2 470 125 A1 | 6/2003 |
| DE | 103 26 703 A1 | 2/2004 |
| EP | 1 113 517 A2 | 7/2001 |
| EP | 1 274 142 A2 | 1/2003 |
| EP | 1 274 147 A2 | 1/2003 |
| EP | 1 431 281 A1 | 6/2004 |
| FR | 2 811 323 A1 | 7/2000 |
| GB | 1 035 242 | 7/1966 |
| GB | 2 395 952 A | 6/2004 |
| JP | 08020704 | 1/1996 |
| JP | 2003-142125 | 5/2003 |
| JP | 2004-263052 | 9/2004 |
| JP | 2005-060484 * | 3/2005 |
| WO | WO 97/50143 A1 | 12/1997 |
| WO | WO 00/05774 A1 | 2/2000 |
| WO | WO 01/19896 A1 | 3/2001 |
| WO | WO 01/70858 A2 | 9/2001 |
| WO | WO 02/05370 A1 | 1/2002 |
| WO | WO 02/087001 A2 | 10/2002 |
| WO | WO 03/030289 A2 | 4/2003 |
| WO | WO 03/050897 A2 | 6/2003 |
| WO | WO 03/054995 A1 | 7/2003 |
| WO | WO 03/097718 A1 | 11/2003 |
| WO | WO 03/097719 A1 | 11/2003 |
| WO | WO 2004/035662 A1 | 4/2004 |

OTHER PUBLICATIONS

English machine translation of JP 2005-060484.*
Corresponding Japanese Office Action of Mar. 24, 2009.
Feng Wang, Taianlu Chen, Jiping Xy, "Sodium Sulfonate—Functional Poly(ether ketone)s", Macromol, Chem Phys. 199, 1421-1426 (1998).

* cited by examiner

TRIBLOCK COPOLYMERS WITH ACIDIC GROUPS

BACKGROUND OF THE INVENTION

1. Field of the Invention

The present invention relates to triblock copolymers that are formable into ion conductive membranes useful in PEM fuel cells.

2. Background Art

Fuel cells are used as an electrical power source in many applications. In particular, fuel cells are proposed for use in automobiles to replace internal combustion engines. In proton exchange membrane ("PEM") type fuel cells, hydrogen is supplied to the anode of the fuel cell and oxygen is supplied as the oxidant to the cathode. The oxygen can be either in a pure form ($O_2$) or air (a mixture of $O_2$ and $N_2$). PEM fuel cells typically have a membrane electrode assembly ("MEA") in which a solid polymer membrane has an anode catalyst on one face and a cathode catalyst on the opposite face. The MEA, in turn, is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

In order to efficiently produce electricity, the polymer electrolyte membrane of a PEM fuel cell typically, must be thin, chemically stable, proton transmissive, non-electrically conductive, and gas impermeable. Moreover, during operation of the fuel cell, the PEM is exposed to rather severe conditions, which include, hydrolysis, oxidation and reduction (hydrogenation) that can lead to degradation of the polymer thereby reducing the lifetime of a polymer electrolyte membrane. The combination of these requirements imposes rather strict limitations on material choices for these membranes. Presently, there are relatively few polymer systems that provide even marginally acceptable results for the combination of these requirements. An example of a PEM is the Nafion membrane developed by DuPont in 1966 as a proton conductive membrane. This membrane is possibly the only advanced polymer electrolyte currently available for use in a membrane electrode assembly in a fuel cell.

Other polymer systems that may be used in PEM applications are found in U.S. Pat. No. 4,625,000 (the '000 patent), U.S. Pat. No. 6,090,895 (the '895 patent), and EP Patent No. 1,113,517 A2 (the '517 patent). The '000 discloses a sulfonation procedure forming poly(ether sulfone)s that may be used in solid polymer electrolyte application. However, the '000 patent's post-sulfonation of preformed polymers offers little control of the position, number, and distribution of the sulfonic acid groups along the polymer backbone. Moreover, the water uptake of membranes prepared from post sulfonated polymers increases, leading to large dimensional changes as well as a reduction in strength as the degree of sulfonation increases.

The '895 patent discloses a process for making cross linked acidic polymers of sulfonated poly(ether ketone)s, sulfonated poly(ether sulfone)s, sulfonated polystyrenes, and other acidic polymers by cross linking with a species which generates an acidic functionality. However, this reference does not suggest an effective way to cast membranes from those cross linked sulfo-pendent aromatic polyethers.

The '517 patent discloses a polymer electrolyte containing a block copolymer comprising blocks having sulfonic acid groups and blocks having no sulfonic acid groups formed by post sulfonation of precursor block copolymers consisting of aliphatic and aromatic blocks. In this patent, the precursor block copolymers are sulfonated using concentrated sulfuric acid, which leads to the sulfonation of aromatic blocks. However, once again, this post sulfonation of aromatic blocks offers the little control of the position, number, and distribution of the sulfonic acid groups along the polymer backbone. Furthermore, this post sulfonation of precursor block copolymers also leads to the cleavage of chemical bonds of the aliphatic block.

Although some of the proton conducting membranes of the prior art function adequately in hydrogen fuel cells, these membranes tend to require high humidity (up to 100% relative humidity) for efficient long-term operation. Moreover, prior art membranes are not able to efficiently operate at temperatures above 80° C. for extended periods of time. This temperature limitation necessitates that these membranes be constantly cooled and that the fuel (i.e., hydrogen) and oxidant be humidified.

Accordingly, there exists a need for improved materials for forming polymer electrolyte membranes and for methods of forming such materials.

SUMMARY OF THE INVENTION

The present invention overcomes the problems encountered in the prior art by providing in one embodiment a triblock copolymer that can be formed into an ion-conductive membrane. Triblock copolymers useful for forming ion conductive membranes are provided. The triblock copolymers are characterized by having either a hydrophobic-hydrophilic-hydrophobic or a hydrophilic-hydrophobic-hydrophilic polymer sequence that induces a micro-phase separated morphology. The triblock copolymer of this embodiment comprises a polymer having formula 1:

$$A_m\text{-}B_n\text{—}C_p \qquad 1$$

wherein:

A is a first polymer segment that is repeated m times to form first polymer block $A_m$ that is either hydrophobic or hydrophilic;

B is a second polymer segment that is repeated n times to form second polymer block $B_n$ that is either hydrophobic or hydrophilic;

C is a third polymer segment that is repeated p times to form third polymer block $C_p$ that is either hydrophobic or hydrophilic; and m, n, and p are each independently integers from 1 to 200; with the proviso that when A is hydrophobic, B is hydrophilic and C is hydrophobic; or when A is hydrophilic, B is hydrophobic and C is hydrophilic. Moreover, when A is hydrophilic, A comprises a first substituent for proton transfer, when B is hydrophilic, B includes a second substituent for proton transfer, and when C is hydrophilic, C includes a third substituent for proton transfer.

In another embodiment of the invention, an ion conducting membrane incorporating the block copolymers of the invention is provided. The ion conducting membrane is advantageously useable in a fuel cell, and in particular, a hydrogen fuel cell, operating continuously at temperatures up to about 120° C. Membranes formed from the block copolymers of the invention are characterized by having a microphase separated morphology due to the alternating hydrophobic and hydrophilic polymer sequences. Moreover, the ion conducting membranes of this embodiment have higher proton conductivities at low relative humidities than random copolymers of similar composition.

DETAILED DESCRIPTION OF THE PREFERRED EMBODIMENT(S)

Figure 1:
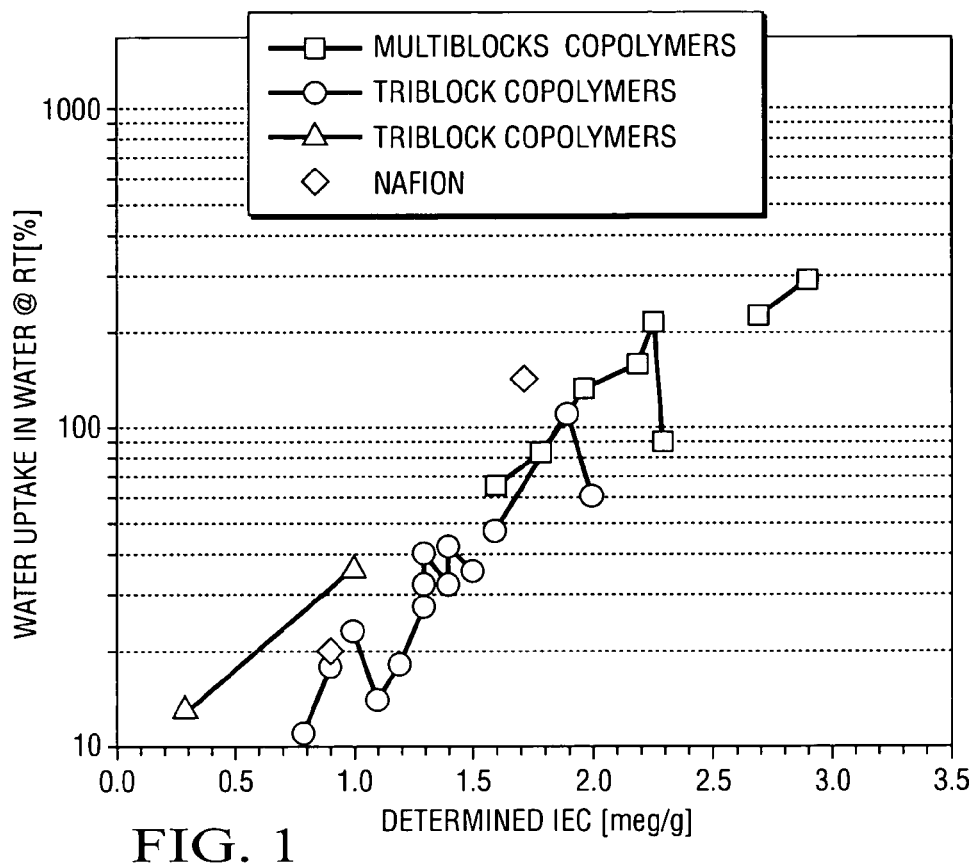
FIG. 1 provides plots that compare specific conductivities vs. determined IEC at 80° C. and 26% r.h: squares correspond to a multiblock copolymer with hydrophilic block having formula 8 and hydrophobic block having formula 17; circles correspond to a triblock copolymer with a hydrophilic block ($B_m$) having formula 8 and hydrophobic blocks ($A_n$ and $C_m$) having formula 17; triangles correspond to a triblock copolymer with a hydrophilic block ($B_m$) having formula 9 and hydrophobic block having formula 17, and diamonds correspond to nafion.

Reference will now be made in detail to presently preferred compositions or embodiments and methods of the invention, which constitute the best modes of practicing the invention presently known to the inventors.

The term "block" as used herein means a portion of a macromolecule, comprising many constitutional units, that has at least one feature which is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprises constitutional units derived from different characteristic species of monomer or with different composition or sequence distribution of constitutional units.

The term "random copolymer" as used herein means a copolymer consisting of macromolecules in which the probability of finding a given monomeric unit at any given site in the chain is independent of the nature of the adjacent units.

In an embodiment of the invention, a triblock copolymer for use as a solid polymer electrolyte is provided. In particular, the triblock copolymers of the invention are particularly useful for forming ion conductive membranes to be used in PEM fuel cells. The block copolymers of this embodiment are characterized by having a sequence comprising a hydrophobic block, a hydrophilic block, and a hydrophobic block joined together in that order or a sequence comprising a hydrophilic block, a hydrophobic block, and a hydrophilic block joined together in that order. The hydrophobic and hydrophilic sequences are immiscible thereby inducing a microphase separated morphology in films cast from these materials. This morphology includes, for example, morphologies such as spheres, cylinders, lamellae, ordered bi-continuous double diamond structures, disordered bicontinuous structures, and combinations thereof. The block copolymer of the invention comprises a polymer having formula 1:

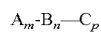

$$A_m\text{-}B_n\text{-}C_p \qquad 1$$

wherein:

A is a first polymer segment that is repeated m times to form first polymer block $A_m$ that is either hydrophobic or hydrophilic;

B is a second polymer segment that is repeated n times to form second polymer block $B_n$ that is either hydrophobic or hydrophilic;

C is a third polymer segment that is repeated p times to form third polymer block $C_p$ that is either hydrophobic or hydrophilic; and m, n, and p are each independently integers from 1 to 200. The block copolymer described by formula 1 is further limited by the proviso that when A is hydrophobic, B is hydrophilic and C is hydrophobic. Similarly, when A is hydrophilic, B is hydrophobic and C is hydrophilic. Consistent with these two provisos, when A is hydrophilic, A includes a first substituent for proton transfer, when B is hydrophilic, B includes a second substituent for proton transfer, and when C is hydrophilic, C includes a third substituent for proton transfer.

The first, second, and third substituents for proton transfer each independently include when present an acidic substituent or salt thereof. Examples of suitable substituents for proton transfer include —$SO_3H$, —$SO_3^-M^+$, —$COOH$, —$COO^-M^+$, —$PO_3H_2$, —$PO_3H^-M^+$, —$PO_3^{2-}M_2^+$, —$PO_3^{2-}M^{2+}$, and combinations thereof. Sulfonic and phosphonic acid groups and salts thereof have been found to be particularly useful in this embodiment. In these examples, M is a metal such as an alkali or alkaline-earth metal. Particularly useful metals are sodium, potassium, lithium, and the like.

In a variation of the invention, the first block $A_m$ has a molecular weight from about $5\times10^2$ to about $5\times10^5$ (g/mol), the second polymer block $B_n$ has a molecular weight from about $5\times10^2$ to about $5\times10^5$ (g/mol), and the third polymer block $C_n$ has a molecular weight from about $5\times10^2$ to about $5\times10^5$ (g/mol). Moreover, the triblock copolymer of the invention is characterized by having alternating hydrophobic and hydrophilic blocks. For example, when $A_m$ and $C_k$ are both hydrophilic, A and C are each independently described by formula 2 or when $B_n$ is hydrophilic, B is described by formula 2:

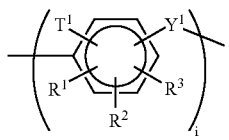

wherein:

$Y^1$ is —O—, —S—, —CO—, —SO$_2$—, —C(CH$_3$)$_2$—, —C(CF$_3$)$_2$—, —PO(T$^1$)-, —C(CH$_3$)(T$^1$)-, —PO(R$^4$)—, diphenyl methylene, diphenyl silicon, fluorenyl, an alkylene, a bond directly to the next aromatic ring, or

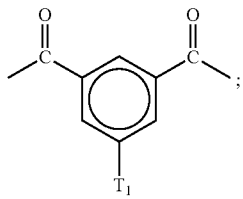

$R^1$, $R^2$, and $R^3$ are each independently H, $C_{1-10}$ alkyl, $C_{6-18}$ aryl, $C_{6-18}$ aralkyl, —SO$_3$H, —SO$_3^-$M$^+$, —COOH, —COO$^-$M$^+$, —PO$_3$H$_2$, —PO$_3$H$^3$H$^-$M$^+$, —PO$_3^{2-}$M$_2^+$, or —PO$_3^{2+}$M$^{2+}$;

$R^4$ is H, $C_{1-10}$ alkyl, $C_{6-18}$ aryl, or $C_{6-18}$ aralkyl;

$T^1$ is H or a moiety having at least one substituent for proton transfer; and i is an integer from 1 to 6.

Polymer segment B having formula 2 is further limited by the proviso that when i>1, the $Y^1$ between sequential aromatic rings are the same or different; the $T^1$ on sequential aromatic rings are the same or different; and the $R^1$, $R^2$, and $R^3$ on sequential aromatic rings are the same or different. Moreover, for at least one aromatic ring in formula 2, either $T_1$ is not H or one of $R^1$, $R^2$, and $R^3$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$. The presence of a phosphonic acid group or related salt (i.e., —PO$_3$H$_2$, —PO$_3$H$^-$M$^+$, —PO$_3^{2-}$M$_2^+$, —PO$_3^{2-}$M$^{2+}$) in $T^1$ or in $R^1$, $R^2$, and $R^3$ is particularly useful. In a variation of this embodiment, at least one of $R^1$, $R^2$, and $R^3$ is —PO$_3$H$_2$, —PO$_3$H$^-$M$^+$, —PO$_3^{2-}$M$_2^+$, or —PO$_3^{2+}$M$^{2+}$. Since phosphonic acid is a dibasic acid with a weakly dissociating second acid group, an alternative mechanism for proton transport that is not possible in monobasic acids such as sulfonic acid, is available. Moreover, this mechanism is expected to operate even at low water contents. Accordingly, such polymers exhibit higher proton conductivity at a lower humidity and water content than polymers of similar structure with sulfonic acid groups. Although the beneficial effects of using phosphonic acid groups are not limited to any particular mechanism, the proton transport mechanism in the presence of phosphonic acid groups is believed to be a Grotthus mechanism that operates through chains of hydrogen bonds thereby requiring a non-dissociated group.

In a particularly useful variation of this embodiment, $T_1$ is described by formula 3:

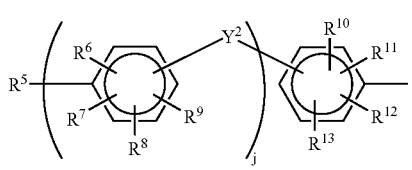

wherein:

$Y^2$ is —O—, —S—, —CO—, —SO$_2$—, —C(CH$_3$)$_2$—, —C(CF$_3$)$_2$—, —PO(R$^4$)—, diphenyl methylene, diphenyl silicon, fluorenyl, an alkylene, or a bond directly to the next aromatic ring;

$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, and —PO$_3^{2-}$M$^{2+}$;

$R^4$ is H, $C_{1-10}$ alkyl, $C_{6-18}$ aryl, or $C_{6-18}$ aralkyl;

M is a metal, ammonium, or alkylammonium; and j is an integer from 1 to 30.

Formula 3 which describes side chain $T^1$ is further limited by the proviso that when j>1, the $Y^2$ between sequential aromatic rings are the same or different and the $R^5$, $R^6$, $R^7$, $R^8$, and $R^9$ on sequential aromatic rings are the same or different. Moreover, at least one of $R^5$, $R^6$, $R^7$, $R^8$, $R^9$, $R^{10}$, $R^{11}$, $R^{12}$, and $R^{13}$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$. In this variation, $T^1$ includes acidic groups on spacers. Spacers are side chains that position the acidic groups at a distance from a main chain. This positioning on spacers allows for the acidic groups to arrange themselves in orientations suitable for proton dissociation at low water levels through neighboring-group interactions. In a variation of this embodiment, $Y^1$ in formula 2 and $Y^2$ in formula 3 (for $T^1$) are —S— and —SO$_2$—. In another variation of this embodiment, acidic groups are not present in formula A, B, or C. In this variation, —O— and —CO— are present in the hydrophilic blocks.

Similarly, when A and C are both hydrophobic, A and C are each independently described by formula 4 or when B is hydrophobic, B is described by formula 4:

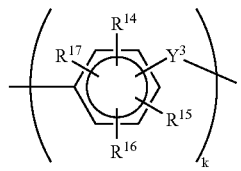

wherein:

$Y^3$ is —O—, —S—, —CO—, —SO$_2$—, —C(CH$_3$)$_2$—, —C(CF$_3$)$_2$—, —PO(T$^1$)-, —C(CH$_3$)(T$^1$)-, —PO(R$^4$)—, diphenyl methylene, diphenyl silicon, fluorenyl, an alkylene, a bond directly to the next aromatic ring, or

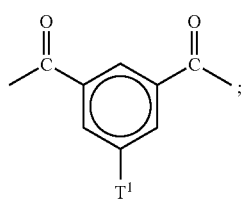

$R^{14}$, $R^{15}$, $R^{16}$, and $R^{17}$ are each independently H, $C_{1-18}$ alkyl, $C_{6-18}$ aryl, and $C_{6-18}$ aralkyl;

$R^4$ is H, $C_{1-10}$ alkyl, $C_{6-18}$ aryl, or $C_{6-18}$ aralkyl; and k is an integer from 1 to 30.

The hydrophobic polymer segment that is described by formula 4 is further limited by the proviso that when k>1, the $Y_3$ between sequential aromatic rings are the same or different, and the $R^{14}$, $R^{15}$, $R^{16}$, and $R^{17}$ on sequential aromatic rings are the same or different. In at least one relatively preferred variation of this embodiment, $R^{14}$, $R^{15}$, $R^{16}$, and $R^{17}$ are each H.

As set forth above, formula 2 provides examples of hydrophilic blocks. Specific examples when A, B, or C are hydrophilic are given by formulae 5 through 16 and salts thereof:

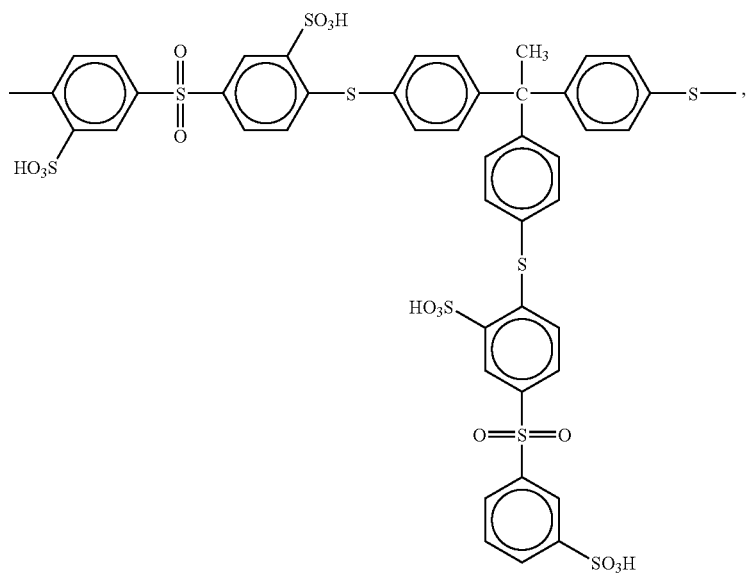

5

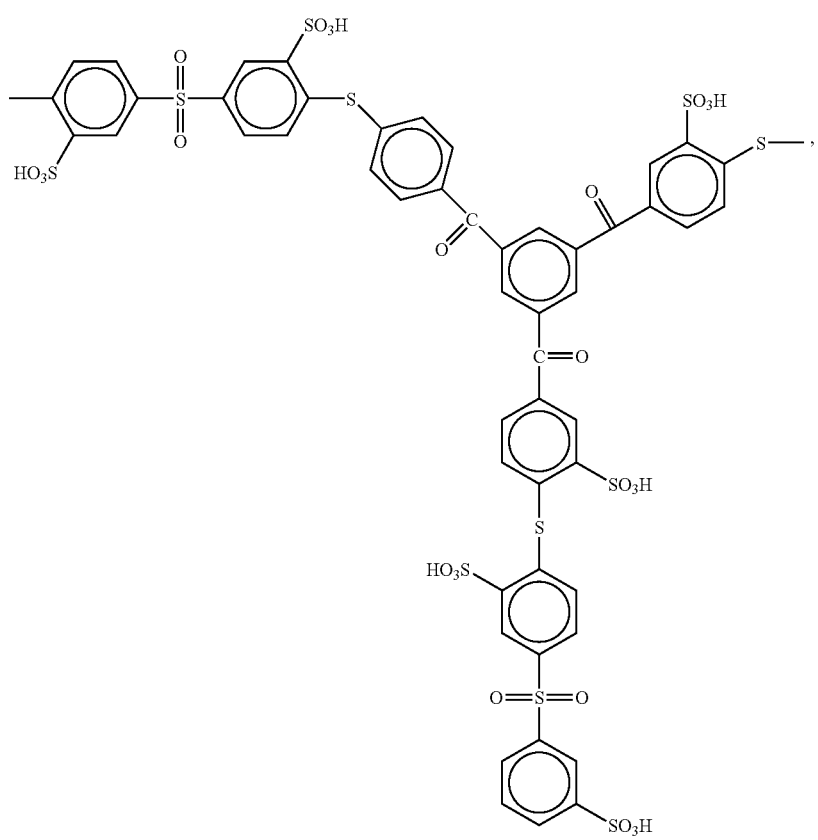

6

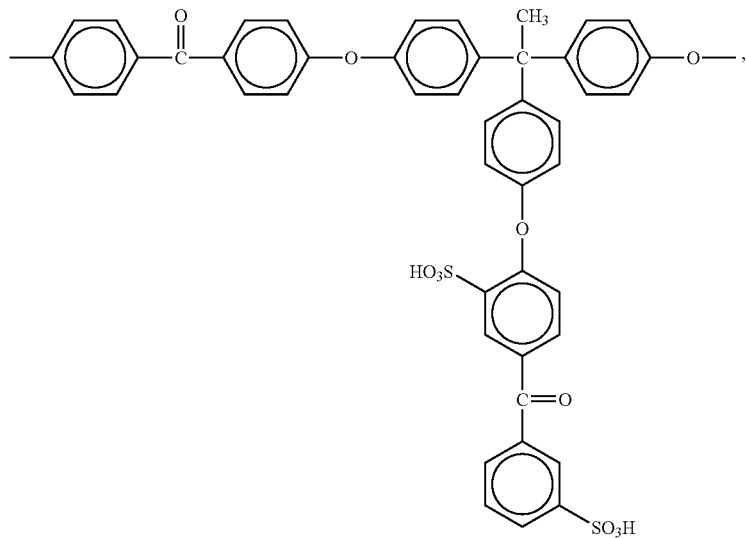
7
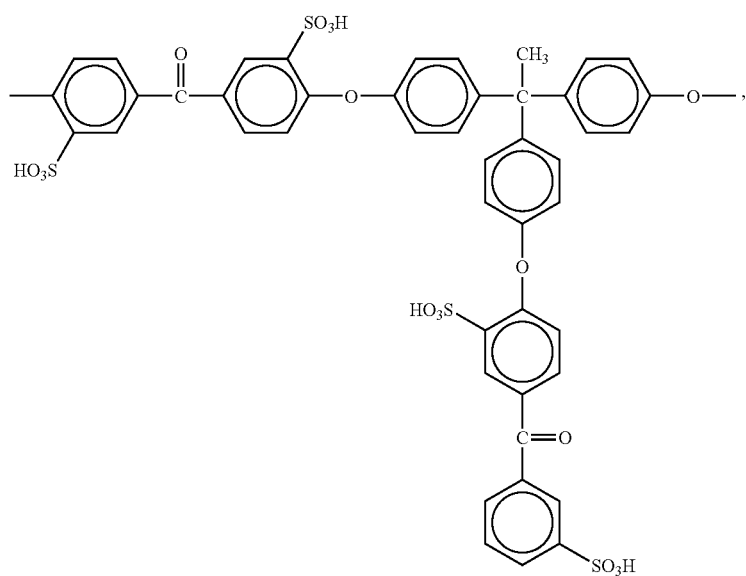
8

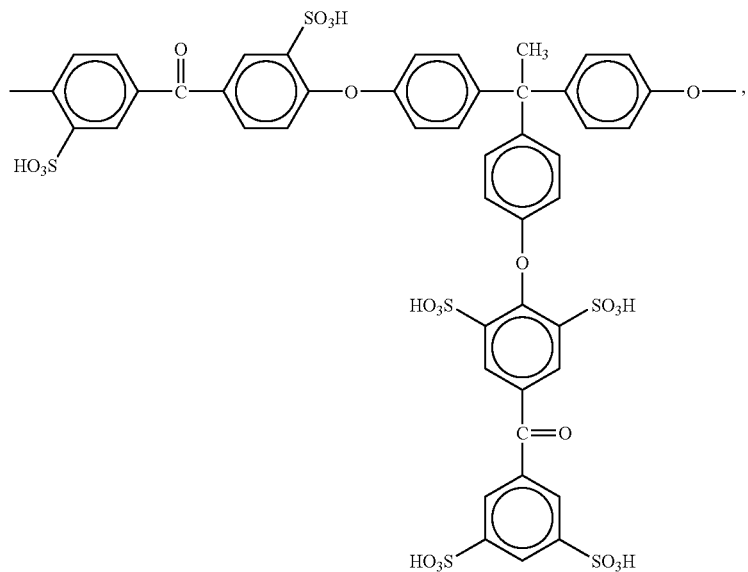
9
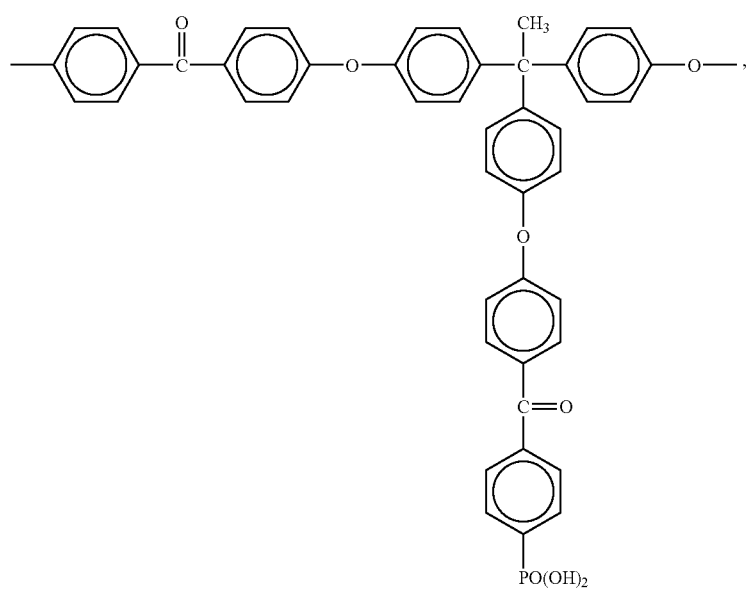
10

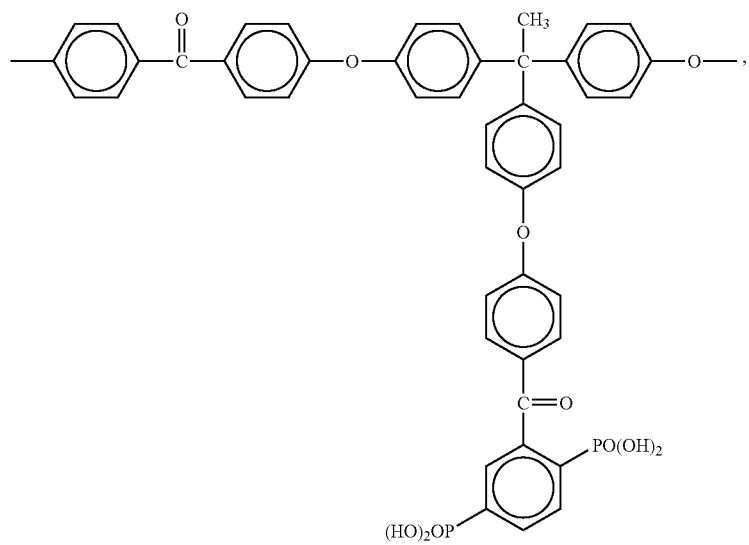
11
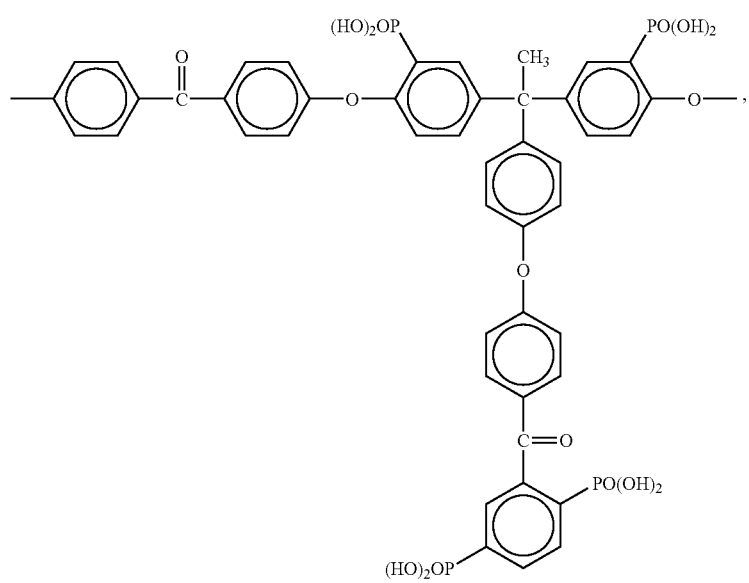
12
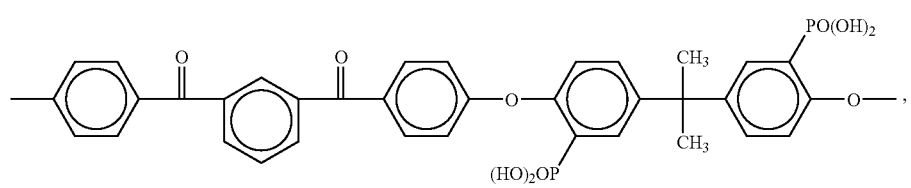
13

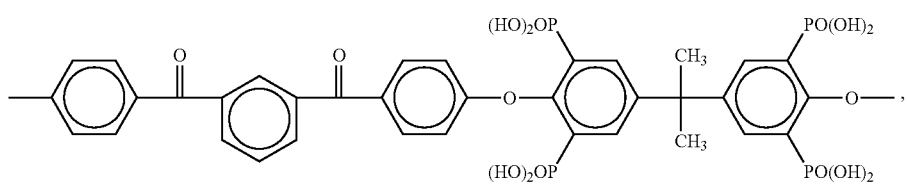
(14)
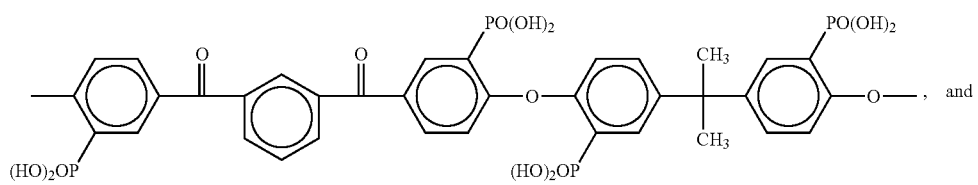
(15)
, and
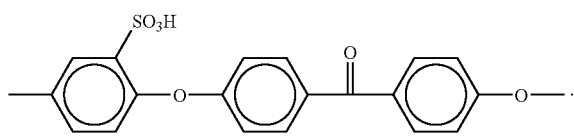
(16)
As set forth above, formula 4 provides examples of hydrophobic blocks. Specific examples when A, B, or C are hydrophobic are provided by formulae 17 through 20 and salts thereof:
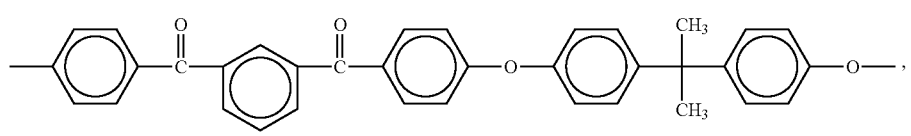
(17)
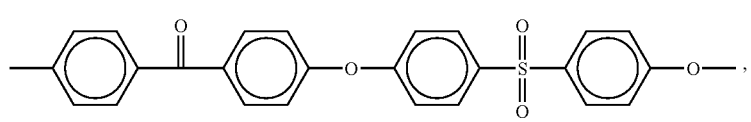
(18)
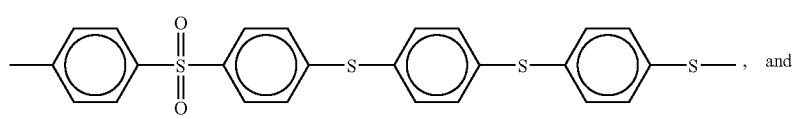
(19)
, and
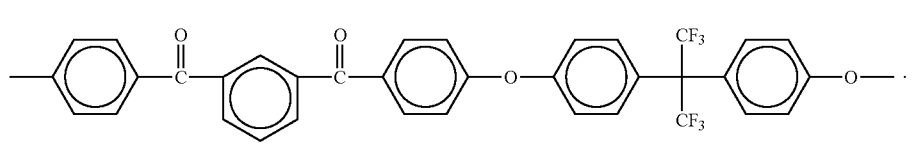
(20)

In another embodiment of the invention, a triblock copolymer is provided. The triblock copolymer of this embodiment is described by formula 1:

$$A_m B_n C_p \quad 1$$

wherein:

when $A_m$ and $C_p$ are both hydrophilic, A and C are each independently described by formula 21 and B is a hydrophobic polymer segment; or when $B_n$ is hydrophilic, B is described by formula 21 and A and C are each independently hydrophobic polymer segments:

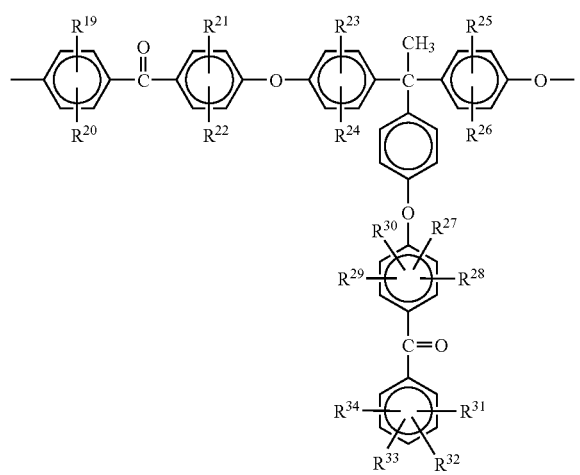

21 m, n, and p are integers;

$R^{19}, R^{20}, R^{21}, R^{22}, R^{23}, R^{24}, R^{25}, R^{26}, R^{27}, R^{28}, R^{29}, R^{30}, R^{31}, R^{32}, R^{33}$, and $R^{34}$ are each independently H, —SO$_3$H, —S$_3^-$M$^+$, —COOH, —COO$^{8-}$M$^+$, —PO$_3$H$_2$, —PO$_3$H$^-$M$^+$, —PO$_3^{2-}$M$_2^+$, or —PO$_3^{2-}$M$^{2+}$; and M is a metal, ammonium or alkylammonium as set forth above. In a variation of this embodiment, m, n, and p are each independently an integer from about 1 to about 200.

In an analogous manner as set forth above, when $A_m$ and $C_p$ are both hydrophobic, A and C are each independently described by formula 4 or when $B_n$ is hydrophobic, B is described by formula 4:

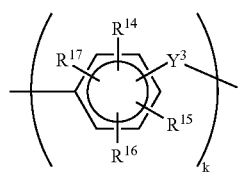

4 wherein:

$Y^3$ is —O—, —S—, —CO—, —SO$_2$—, —C(CH$_3$)$_2$—, —C(CF$_3$)$_2$—, —PO(T$^1$)-, —C(CH$_3$)(T$^1$)-, —PO(R$^4$)—, diphenyl methylene, diphenyl silicon, fluorenyl, an alkylene, a bond directly to the next aromatic ring, or

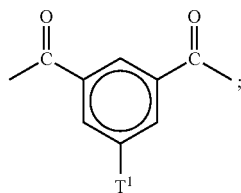

$T^1$ and $R^4$ are defined above;

$R^{14}, R^{15}, R^{16}$, and $R^{17}$ are each independently H, C$_{1-18}$ alkyl, C$_{6-18}$ aryl, or C$_{6-18}$ aralkyl; and k is an integer from about 1 to about 30 less than m.

The polymer segment described by formula 4 is further limited by the proviso that when k>1, the $Y^3$ between sequential aromatic rings are the same or different and the $R^{14}, R^{15}, R^{16}$, and $R^{17}$ on sequential aromatic rings are the same or different.

In another embodiment of the invention, the triblock copolymers set forth above are used to form an ion conductive membrane. As set forth above, the block copolymers of the invention are characterized by having either a hydrophobic-hydrophilic-hydrophobic sequence or a hydrophilic-hydrophobic-hydrophilic sequence that induces a microphase separated morphology when the polymers are formed into films. Due to this microphase separated morphology, the polymer segments with acidic groups are associated in hydrophilic domains that contain essentially no hydrophobic segments. Moreover, the local concentration of acidic groups in the hydrophobic domains is higher than in a randomly sulfonated polymer such as sulfonated poly(ether ether ketone) ("SPEEK"). Moreover, water taken up by membranes will be present only in the hydrophilic domains and not in hydrophobic domains. Therefore, at a given overall ion exchange capacity ("IEC") value and water content, the block copolymers will contain a higher local IEC and water level within the hydrophilic domains than compared to random copolymers. The microphase separated morphology includes, for example, morphologies such as spheres, cylinders, lamellae, ordered bi-continuous double diamond structures, disordered bicontinuous structures, and combinations thereof. The method of making such membranes begins first with preparation of the triblock copolymer. In a first variation of this embodiment, a first polymer having formula 22 is prepared:

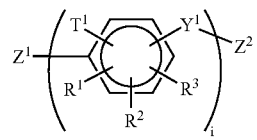

22 wherein $Z^1$ and $Z^2$ are each independently —H, —SH, —S(O)N(R$^{18}$)$_2$, F, Cl, Br, I, —NO$_2$, or —OH; R$^{18}$ is H, C$_{1-10}$ alkyl, cycloalkyl, C$_{1-18}$ aryl, or C$_{6-18}$ aralkyl; and $T^1, R^1, R^2, R^3, Y^1$, and i are the same as that set forth above. Similarly, an end functionalized second polymer block having formula 23 is also synthesized:

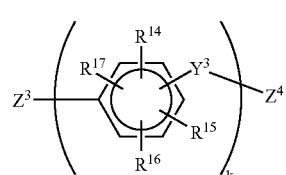

23 wherein $Z^3$ and $Z^4$ are each independently —H, —SH, —S(O)N($R^{18}$)$_2$, F, Cl, Br, I, —NO$_2$, or —OH; $R^{18}$ is H, $C_{1-10}$ alkyl, cycloalkyl, $C_{6-18}$ aryl, or $C_{6-18}$ aralkyl; and $R^{14}$, $R^{15}$, $R^{16}$, $R^{17}$, $Y^3$, and k are the same as that set forth above. In this variation, one of the block polymer having formula 22 or the block polymer having formula 23 must be monofunctional. Accordingly, one of $Z^1$, $Z^2$, $Z^3$ or $Z^4$ must be H. The triblock copolymers of the invention are then prepared by reacting polymer block 22 with polymer block 23.

In another variation of the invention, the polymer block having formula 23 is reacted with one or more monomers suitable for forming the polymer block having formula 22. Specifically, the triblock copolymers of the invention having formula 1 are prepared by synthesizing an end-functionalized polymer block having formula 23:

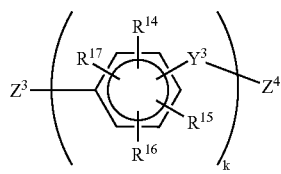

wherein $Z^3$ and $Z^4$ are each independently —H, —SH, —S(O)N($R^{18}$)$_2$, F, Cl, Br, I, —NO$_2$, or —OH; $R^{18}$ is H, $C_{1-10}$ alkyl, cycloalkyl, $C_{6-18}$ aryl, or $C_{6-18}$ aralkyl; and $R^{14}$, $R^{15}$, $R^{16}$, $R^{17}$, $Y^3$, and k are the same as set forth above. Next, the polymer block having formula 23 is reacted with one or more monomers that polymerize into a block having formula 2:

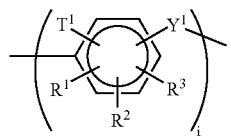

to form the block copolymer having formula 1, wherein $T^1$, $R^1$, $R^2$, $R^3$, $Y^1$, and i are the same as set forth above.

In yet another variation of this embodiment, the polymer block having formula 22 is reacted with one or more monomers suitable for forming the polymer block having formula 23. Specifically, the block copolymers of this embodiment are formed by synthesizing an end-functionalized polymer block having formula 22:

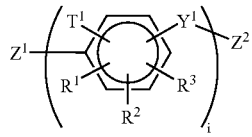

wherein $Z^1$ and $Z^2$ are each independently —H, —SH, —S(O)N($R^{18}$)$_2$, F, Cl, Br, I, —NO$_2$, or —OH; $R^{18}$ is H, $C_{1-10}$ alkyl, cycloalkyl, $C_{6-18}$ aryl, or $C_{6-18}$ aralkyl; and $R^1$, $R^2$, $R^3$, $Y^1$, and i are the same as set forth above. Next, the polymer block having formula 22 is reacted with one or more monomers that polymerize into a block having formula 4:

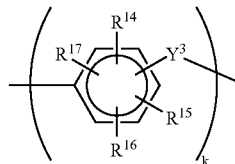

to form the triblock copolymer having formula 1. $R^{14}$, $R^{15}$, $R^{16}$, $R^{17}$, $Y^3$, and k are the same as set forth above.

In an example of the preparation of the block copolymer of the invention, the hydrophobic first polymer block having formula 23 is synthesized using one or more non-sulfonated bis-functional monomers and a monofunctional endcapper. A monofuntional endcapper is used to make sure that one of the end groups $Z^1$ through $Z^4$ is —H. While bis-functional monomers typically include two groups that are halogens (F, Cl, Br, I), or SH or OH, the monofunctional endcapper includes only one such group. Examples of useful bifunctional monomers include 4,4'-difluorobenzophenone, 2,2-bis-(4-hydroxy-phenyl)-propane, 1,3-bis-(4-fluorbenzoyl)benzene, 4,4'-(hexafluoroisopropylidene)-diphenol, 4,4'-difluorobenzophenone, bis-(4-fluorophenyl)-sulfone, 4,4'-thiobisbenzenethiol, and the like. Examples of useful monofunctional endcapper molecules include cresols such as p-cresol, phenol, alcohols such as methanol, arylhalides such as 4-fluorobenzophenone, 4-chlorodiphenylsulfone, and the like. The molecular mass (i.e. number of repeating units) of the block is adjusted by using a defined stoichiometric ratio between the difunctional monomers and the endcapper in a molar ratio from 1:1 to 200:1 (monomers:endcapper). After the reaction is completed, the hydrophobic first triblock copolymer is isolated by precipitation in a solvent such as methanol and washed with excess amounts of the solvent and then with water. Next, the dried hydrophobic first block is reacted with a monomer that includes at least one substituent for proton transfer. Optionally, one or more additional bis-functional monomers that may or may not include substituents for proton transfer are also reacted with the first block. In order to adjust the composition of the triblock the necessary ratio between the monomers building the hydrophilic block and the hydrophobic endblock is used. The polymer is isolated by precipitation and purified in the same manner by precipitation into alcohol as for the endblocks but without washing with water since the triblocks especially when having a large hydrophilic middleblock swell when in contact with water which results in difficulties in filtering the polymer. The yielded polymer flakes are thoroughly dried.

Regardless of the method by which the block copolymers of the invention are formed, the block copolymers are eventually formed or cast into an ion conductive membrane suitable for fuel cell applications. The polymer can be cast from solution in its acid, acid halide or salt form. In addition, a membrane can also be formed by hot pressing or by melt extrusion of the polymer. The behavior of the polymer during hot pressing or during melt extrusion can be improved by transferring the acidic groups in the polymer into ester groups or other protective groups, which can be returned into acid groups after melt processing. In one variation, the acid groups of the block copolymer are transformed to acid halide groups to form a modified block copolymer. Then a film is cast from a solution of the modified block copolymer onto a substrate. Finally, the acid halide groups are transformed back into the acid groups to form the ion conductive membrane. After formation of the multiblock copolymers of the present invention ion conductive membranes can be formed. In a first refinement of this embodiment, the dried polymer is dissolved in a suitable solvent (i.e., DMSO). The polymer solution is then poured into a Petri dish and is covered with a lid in such a way that there is a small gap between the dish and the lid to allow for slow evaporation of the solvent. In another refinement, the dried polymer is also dissolved in a suitable solvent to form a viscous solution. The viscous solution is spread onto a glass plate and brought to a uniform thickness by means of a doctor blade. For both these refinements, the solvent is then removed by drying at elevated temperature in an oven. Finally, the morphology is adjusted by annealing the membrane at an elevated temperature. Typically, this annealing is performed at reduced pressures or in a vacuum. Useful annealing temperatures are either between the glass transition or melting temperatures of the two block types, or between the highest of the glass transition or melt temperatures of the two block types and the order-disorder transition temperature (if present). Temperatures between about 100° C. and 300° C. are useful with an optimal annealing temperature being about 200° C. In some variations of the invention, after polycondensation steps, the multiblock copolymer of the invention is obtained as a sulfonic acid salt or phosphorus acid salt. Therefore the membrane has to be converted into its free sulfonic acid form prior to use. This conversion is accomplished by treating the membranes with a diluted acid (e. g. 1 molar sulfuric acid) for 24 hours. Afterwards the membranes are rinsed thoroughly with DI water to remove excess acid.

The following examples illustrate the various embodiments of the present invention. Those skilled in the art will recognize many variations that are within the spirit of the present invention and scope of the claims.

Ion conducting membranes formed by the polymers set forth in the examples can be characterized by the ion exchange capacity ("IEC"), water uptake, and specific conductivity.

1. Determination of the IEC by Titration:

Membrane pieces in the sulfonic acid form are dried at 120° C. and vacuum for at least 2 hours. About 100 mg of the polymer and 50 ml of aqueous LiCl solution with a concentration of 2 mol/l are put into an Erlenmeyer flask with a cover. The closed flask is placed in an oven at 60° C. over night for the cation exchange. The solution is cooled down to room temperature and three drops of a 0.5 wt. % ethanolic phenolphthalein solution are added as an indicator. The solution including the membrane pieces are titrated with a sodium hydroxide solution having a concentration of 0.1008 mol/l until the first incidence of a pink coloration. If the color fades after 30 seconds, additional drops of the sodium hydroxide solution are added until the pink color persists. The IEC is calculated according to the following equation (V(NaOH) is volume of the NaOH solution and c(NaOH is the concentration of the NaOH solution):

$$IEC[meq/g] = \frac{c(NaOH)[mol/l] \cdot V(NaOH)[ml]}{m(dry\ polmer)[g]}$$

The titration is repeated 5 times for each polymer analyzed.

2. Determination of the Water Uptake

Membrane pieces with a size of about 1 cm² are placed in water at a predetermined temperature and equilibrated for several hours. The wet membrane pieces are padded dry with a paper wipe and weighed with a balance having an accuracy of ±1 µg. The water uptake is calculated according to the following equation:

$$water\ uptake[\%] = \frac{m(wet\ polymer)[mg] - m(dry\ polymer)[mg]}{m(dry\ polymer)[mg]} \cdot 100$$

The measurement is conducted with five pieces for each polymer analyzed.

3. Measurement of the Specific Conductivity:

The specific conductivity measurements are conducted at different temperatures and different relative humidities or in water at different temperatures. The analyzed membranes are in the sulfonic acid form. The impedance is measured with a 4-probe setup. Specifically, AC measurements are carried out at a fixed frequency of 1 kHz with a Fluke RCL meter PM6304. The specific conductivity can be calculated according to the following equation $$\sigma[S/cm] = \frac{1}{Z}\frac{l_{SE}}{w_M \cdot t_M} = \frac{200}{Z[k\Omega] \cdot w_M\ [mm] \cdot t_M\ [\mu m]}$$

where $W_M$ is the width and $t_M$ the thickness of the membrane and $I_{SE}$ is the distance between the two sensor electrodes which is fixed at 20 mm for this sample holder. A Teflon cap is placed on top of the membrane by pressing the membrane with a clamp.

4. Measurement Conditions a. In Water

Measurements in water are performed by first equilibrating the membrane sample in water to ensure that the sample is at a uniform temperature. A uniform temperature is necessary because clamping of the membrane against the electrodes in the sample holder the measurement would be inaccurate if the membrane does not swell homogenously in all directions at elevated temperatures. The width and thickness is measured after the sample is released from the sample holder. The impedance readings are taken after the values stabilize without significant change.

b. At Defined Relative Humidities

The relative humidity ("R.H.") is determined by using saturated salt solutions. Polymer samples are is placed in a sample holder positioned above the salt solution. Adjustment of a specific humidity requires the use of a closed container. The following saturated salt solution are used for producing the R.H. at 80° C. (ASTM, E104-02):

| | Salt | | |
|---|---|---|---|
| | NaCl | NaBr | MgCl$_2$ |
| R.H. @ 80° C. | 74% | 51% | 26% |

Figure 2:
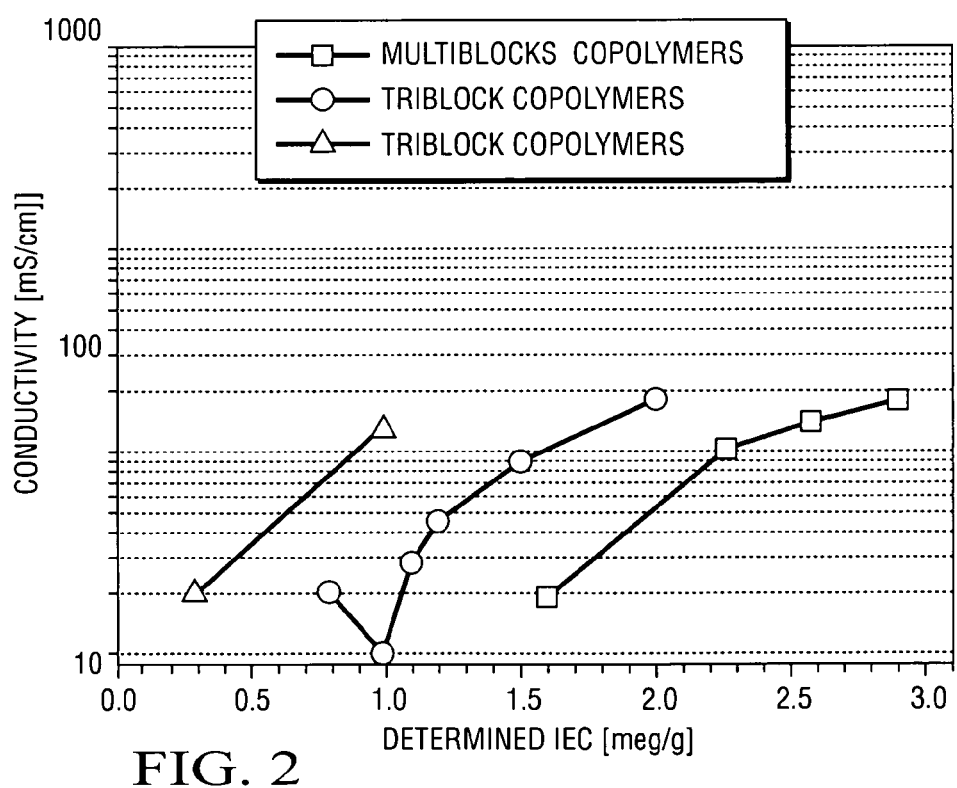
FIG. 2 provides plots that compare water uptake at room temperature vs. determined IEC: squares correspond to a multiblock copolymer with hydrophilic block having formula 8 and hydrophobic block having formula 17; circles correspond to a triblock copolymer with hydrophilic block ($B_m$) having formula 8 and hydrophobic block ($A_n$ and $C_m$) having formula 17; triangles correspond to a triblock copolymer with hydrophilic block ($B_m$) having formula 9 and hydrophobic block ($A_n$ and $C_m$) having formula 17.

With reference to FIG. 1, a comparison of the specific conductivities for a triblock copolymer with bydrophilic block according to structure 8 and hydrophobic block according to structure 17 (Example 1), a triblock copolymer with hydrophilic block according to structure 9 and hydrophobic block according to structure 17 (Example 2), and a multiblock copolymer with hydrophilic block according to structure 8 and hydrophobic block according to structure 17. FIG. 2 provides plots that compare water uptake at room temperature vs. determined IEC of the same polymers. FIG. 1 shows that triblock copolymers (Example 1) exhibit similar proton conductivities as multiblock copolymers at significantly lower IEC. Triblock copolymers with more sulfonic acid groups per repeating units (Example 2) show these conductivities at even lower IEC. At the same time, the plot in FIG. 2 shows that there is a relationship between water uptake and IEC, which is similar for all polymers shown, although there is some scatter of data. A comparison of the data in FIGS. 1 and 2 leads to the conclusion that triblock copolymers, especially those with an increased number of sulfonic acid groups per repeating unit, require less water and therefore less swelling to achieve the same conductivity as multiblock copolymers. This is very important for the use of such membranes in fuel cells, since reduced swelling is beneficial for durability, particularly if the fuel cells are used for automotive applications, where they are exposed to varying levels of humidity. Excessive swelling and deswelling of the membrane in presence of changing levels of water can lead to damage of the membrane-electrode assembly or the gas diffusion layer. Therefore, triblock copolymers such as the ones described in this invention present a significant improvement.

EXAMPLE 1

Synthesis of Triblock Copolymer Having Formula 24

2,2-Bis-(4-hydroxy-phenyl)-propane (46.498 g, 0.2037 mol), 1,3-Bis-(4-fluorbenzoyl)benzene (65.648 g, 0.2037 mol), p-cresol (0.5523 g, 0.0051 mol, purity: 99.7%), potassium carbonate (62.70 g, 0.4537 mol), 360 ml anhydrous N-methyl-pyrrolidone and 75 ml anhydrous cyclohexene are added to a 1000 ml flask equipped with a Dean-Stark trap, a reflux condenser and a nitrogen inlet. The mixture is refluxed at 140° C. for 3 hours under a nitrogen atmosphere. Cyclohexene is removed and the mixture is heated for another 20 hours at 180° C. The mixture is filtered, diluted with 150 ml NMP and 150 ml tetrahydrofuran and poured into 3 l methanol. The precipitated solid is washed with 1 l methanol, 1 l hot D. I. water and then with 1 l methanol. Finally, the solid is dried at 100° C. in vacuum. The yield is 100 g (97%).

B) Preparation of Triblock Copolymer Having Formula 24 (Side and Main Chain Sulfonation, Calc. IEC=1.6 meq/g):

Polymer block having formula 25 (30.57 g, ca. 0.0015 mol), the sulfonated THPE side chain monomer having formula 26 (14.821 g, 0.0201 mol), 4,4'-Difluoro-3,3'-di(potassium sulfonate)-benzophenone (9.475 g, 0.0208 mol) and potassium carbonate (6.34 g, 0.046 mol), 180 ml anhydrous DMSO, 270 ml anhydrous NMP and 80 ml anhydrous benzene are added to a 1000 ml flask equipped with a Dean-Stark trap, reflux condenser and a nitrogen inlet.

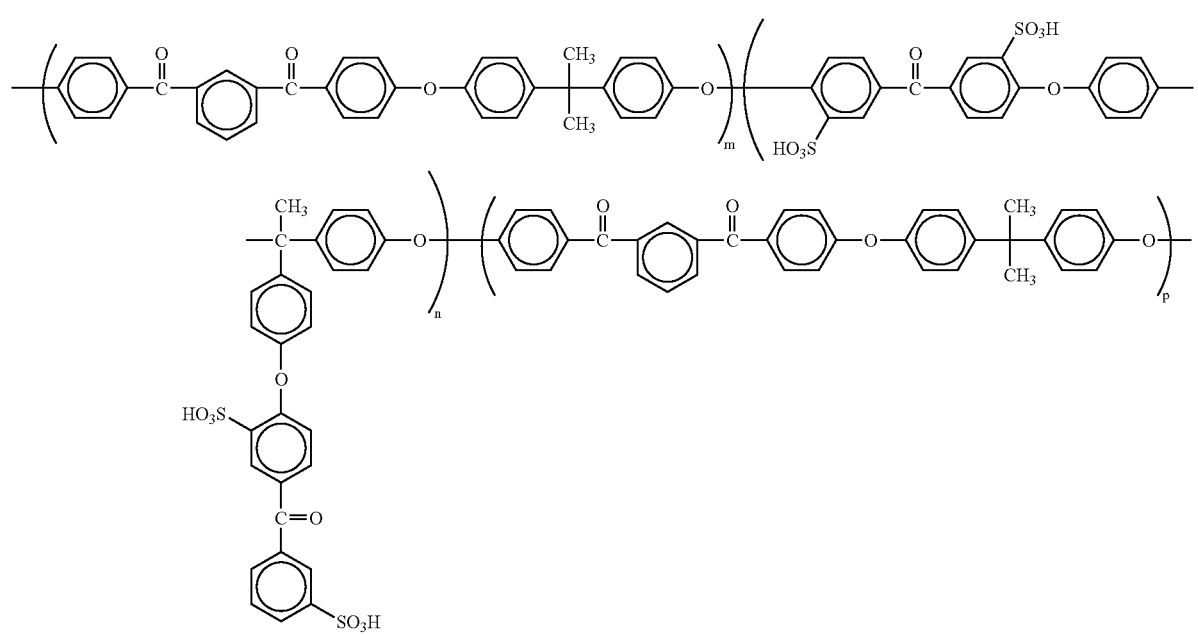

A) Preparation of Block Having Formula 25:

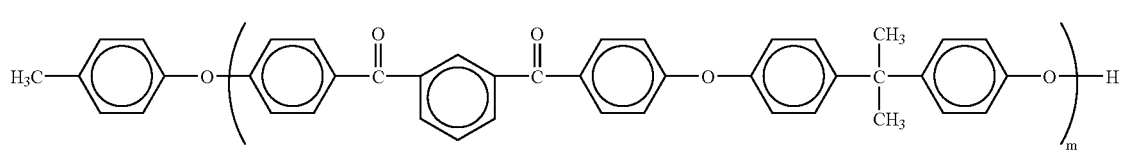

25

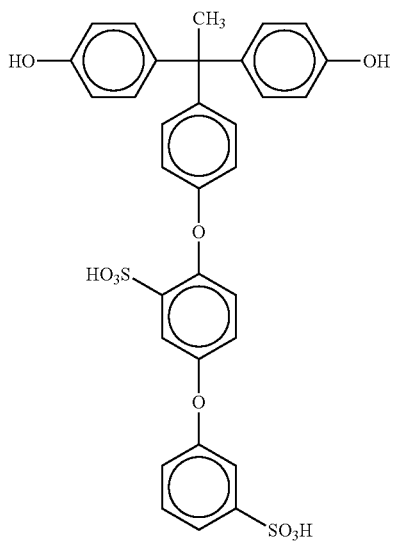

The mixture is refluxed at 140° C. for 4 hours under nitrogen. The benzene is removed and the mixture is heated for further 36 hours at 160° C. The mixture is filtered, diluted with DMSO and acidified with concentrated HCl. The solution is then poured into an excess amount of methanol under vigorous stirring. The precipitated solid is washed with methanol and dried at 100° C. in vacuum. The yield is 47 g (88%). Membranes having a thickness of about 50 μm are cast from a DMSO solution and dried at 120° C. After removing the membranes from the glass plate, the membranes are annealed at 200° C. under vacuum. An IEC of 1.3 meq/g is determined by titration.

EXAMPLE 2

Synthesis of Triblock Copolymer Having Formula 27 (Four Fold Side Chain Sulfonation, Calculated IEC=1.8 meq/g)

26

The block polymer having formula 25 (from Example 1A) (4.50 g, ca. 0.0002 mol), the fourfold sulfonated THPE side chain monomer having formula 28 (1.930 g, 0.0020 mol), 4,4'-difluoro-3,3'-di(potassium sulfonate)-benzophenone (0.946 g, 0.0021 mol), potassium carbonate (0.63 g, 0.0046 mol), 10 ml of anhydrous NMP, 50 ml of anhydrous DMSO and 25 ml of anhydrous benzene are added to a 100 ml flask, equipped with a Dean-Stark trap, a reflux condenser and a nitrogen inlet.

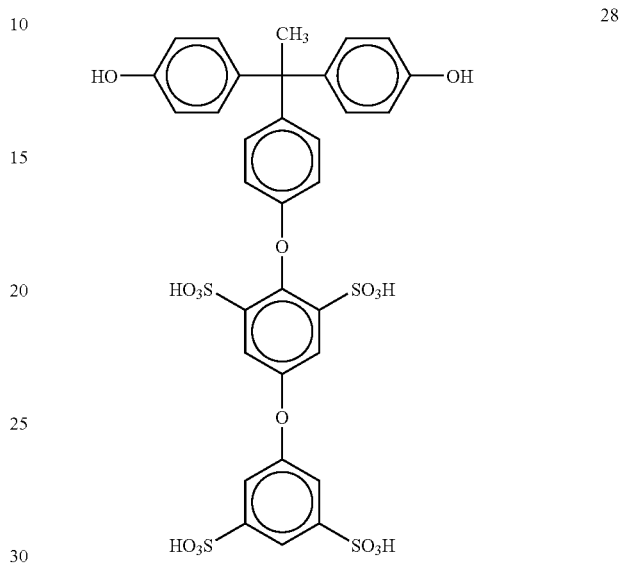

The mixture is refluxed at 140° C. for 3 hours under nitrogen. After the benzene is removed the mixture is heated for 36 hours at 160° C. The reaction mixture is filtered, acidified with concentrated HCl and poured into 0.6 l methanol under vigorous stirring. The precipitated solid is washed with methanol and dried at 100° C. in vacuum. The yield is 5.6 g (77%). Membranes having a thickness of about 30 μm are cast from a DMSO solution and dried at 120° C. After the membranes are removed from the glass plate, the membranes are additionally annealed at 200° C. under vacuum. The IEC of 1.0 meq/g is determined by titration.

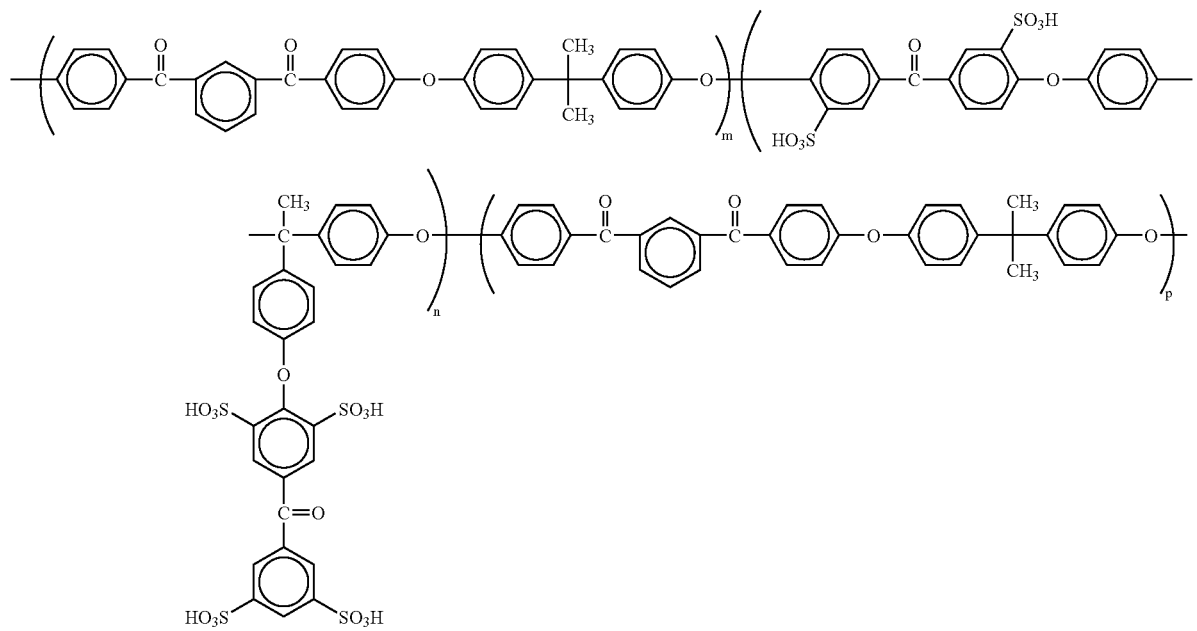

EXAMPLE 3

Synthesis of Triblock Copolymer Having Formula 29

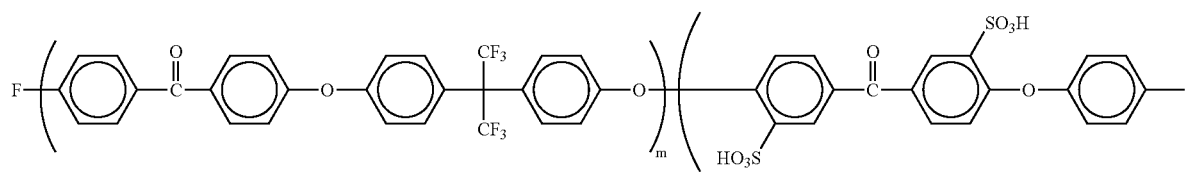

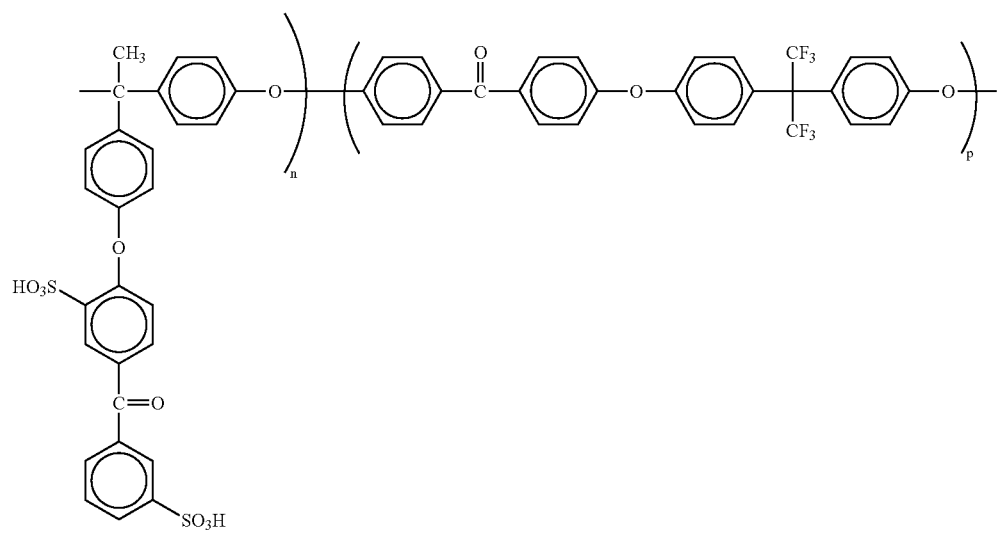

A) Preparation of Block Having Formula 30:

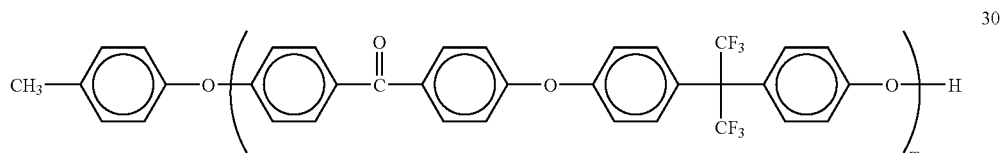

4,4'-(hexafluoroisopropylidene)-diphenol (36.962 g, 0.1099 mol), 4,4'-difluorobenzophenone (13.987 g, 0.1099 mol), p-cresol (0.2990 g, 0.0028 mol, purity: 99.7%), potassium carbonate (34.0 g, 0.246 mol, 130 ml anhydrous N-methyl-pyrrolidone (15 wt.-% of reactive solids) and 50 ml anhydrous cyclohexene are added to a 500 ml flask equipped with a Dean-Stark trap reflux condenser, a reflux condenser and a nitrogen inlet. The mixture is refluxed at 140° C. for 3 hours under nitrogen atmosphere. Cyclohexene is removed, and the mixture is heated for further 20 hours at 180° C. The mixture is filtered, diluted with 50 ml NMP and 50 ml tetrahydrofuran and poured into 1.5 l methanol. The precipitated solid is washed with 1 l methanol, 1 l D. I. water (70-80° C.), 1 l methanol and dried at 100° C. in vacuum. The yield is 51 g (91%).

B) Preparation of Triblock Copolymer Having Formula 29 (Calculated IEC=2.3 meq/g)

The polymer block having formula 30 (4.50 g, ca. 0.0002 mol), the twofold sulfonated THPE side chain monomer having formula 26 (4.175 g, 0.0057 mol), 4,4'-Difluoro-3,3'-di (potassium sulfonate)-benzophenone (2.624 g, 0.0058 mol), potassium carbonate (1.75 g, 0.013 mol), 55 ml anhydrous NMP, 35 ml of anhydrous DMSO and 40 ml of anhydrous benzene are added to a 250 ml flask, equipped with a Dean-Stark trap, a reflux condenser and a nitrogen inlet. The mixture is refluxed at 140° C. for 3 hours under nitrogen. After the benzene is removed the mixture is heated for 36 hours at 160° C. The reaction mixture is filtered, acidified with concentrated HCl and poured into an excessive amount of methanol under vigorous stirring. The precipitated solid is washed with methanol and dried at 100° C. in vacuum. The yield is 8.8 g (80%). Membranes having a thickness of about 30 μm thick are cast from a DMSO solution and dried at 120° C. After the membranes are removed from the glass plate, the membranes are additionally annealed at 200° C. under vacuum. The IEC of 2.0 meq/g is determined by titration.

EXAMPLE 4

Synthesis of Triblock Copolymer Having Formula 31

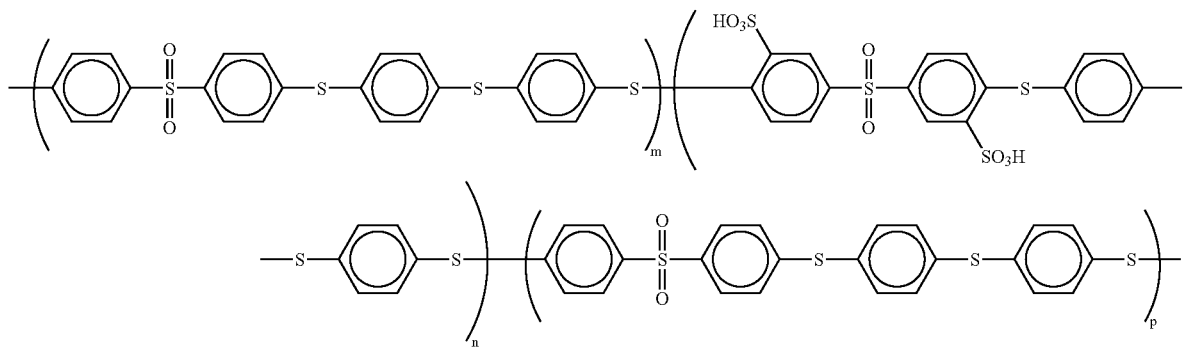

A) Preparation of Polymer Block Having Formula 32

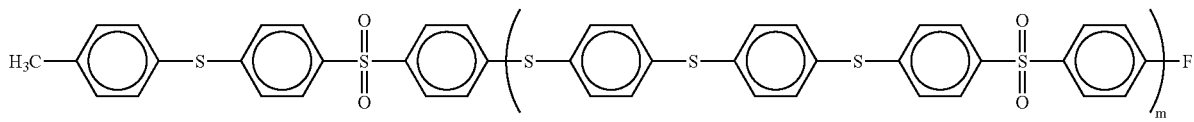

Bis-(4-fluorophenyl)-sulfone (43.2443 g, 0.1701 mol), 4,4'-Thiobisbenzenethiol (41,6219 g, 0.1662 mol), p-thiocresol (0.4849 g, 0.0039 mol, purity: 99%), potassium carbonate (51.1 g, 0.37 mol), 330 ml anhydrous N-methyl-pyrrolidone (15 wt.-% of reactive solids) and 50 ml anhydrous cyclohexene are added to a 1000 ml flask equipped with a Dean-Stark trap reflux condenser, a reflux condenser and a nitrogen inlet. The mixture is refluxed at 140° C. for 3 hours under nitrogen atmosphere. Cyclohexene is removed, and the mixture is heated for further 4 hours at 160° C. The mixture is acidified with concentrated HCl and poured into 3 l methanol. The precipitated solid is washed with 1 l methanol, 1 l D. I. water (70-80° C.), 1 l methanol and dried at 100° C. in vacuum. The yield is 76 g (96%).

B) Preparation of Triblock Copolymer Having Formula 31 (Calculated IEC=2.3 meq/g)

The polymer block having formula 32 (2.01 g, ca. 0.0001 mol), Bis-(4-fluoro, 3-(potassium sulfonate)-phenyl)-sulfone (4.127 g, 0.00841 mol), 4,4'-Thiobisbenzenethiol (2.119 g, 0.00846 mol), potassium carbonate (2.57 g, 0.019 mol), 70 ml of anhydrous NMP and 40 ml of anhydrous benzene are added to a 250 ml flask, equipped with a Dean-Stark trap, a reflux condenser and a nitrogen inlet. The mixture is refluxed at 140° C. for 3 hours under nitrogen. After the benzene is removed the mixture is heated for 4 hours at 120° C. The reaction mixture is filtered, acidified with concentrated HCl and poured into an excessive amount of methanol under vigorous stirring. The precipitated solid is washed with methanol and dried at 100° C. in vacuum. The yield is 4.5 g (56%). Membranes having a thickness of about 60 μm are cast from a NMP solution and dried at 120° C. The IEC of 1.9 meq/g is determined by titration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A triblock copolymer for use as a solid polymer electrolyte, the block copolymer comprising a polymer having formula (1):

$$A_m\text{-}B_n\text{---}C_p \tag{1}$$

wherein:

A is a first polymer segment that is repeated m times to form first polymer block $A_m$ that is either hydrophobic or hydrophilic;

B is a second polymer segment that is repeated n times to form second polymer block $B_n$ that is either hydrophobic or hydrophilic;

C is a third polymer segment that is repeated p times to form third polymer block $C_p$ that is either hydrophobic or hydrophilic, m, n, and p are each independently an integer from 1 to 200;

with the proviso that when A is hydrophobic, B is hydrophilic and C is hydrophobic;

or when A is hydrophilic, B is hydrophobic and C is hydrophilic, wherein when A is hydrophilic, A comprises a first substituent for proton transfer, when B is hydrophilic, B includes a second substituent for proton transfer, and when C is hydrophilic, C includes a third substituent for proton transfer and wherein when $A_m$ and $C_p$ are both hydrophilic, A and C are each independently described by formula (2) or when $B_n$ is hydrophilic, B is described by formula (2):

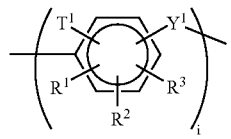
2

$Y^1$ is —O—, —S—, —CO—, —SO$_2$—, —C(CH$_3$)$_2$—, or —C(CF$_3$)$_2$—, —PO(T$^1$)-, —C(CH$_3$)(T$^1$)-, —PO(R$^4$)—, diphenyl methylene, diphenyl silicon, fluorenyl, an alkylene, a bond directly to the next aromatic ring, or

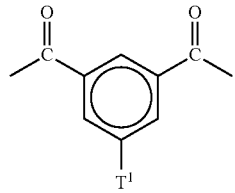

$R^1$, $R^2$, and $R^3$ are each independently H, $C_{1-10}$ alkyl, $C_{6-18}$ aryl, $C_{6-18}$ aralkyl, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

M is a metal, ammonium or alkylammonium;

$R^4$ is H, $C_{1-10}$ alkyl, $C_{6-18}$ aryl, or $C_{6-18}$ aralkyl;

$T^1$ is given by H or formula (3):

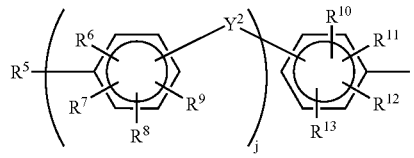
3

$Y^2$ is —O—, —S—, —CO—, —SO$_2$—, —C(CH$_3$)$_2$—, or —C(CF$_3$)$_2$—, —PO(R$^4$)—, diphenyl methylene, diphenyl silicon, fluorenyl, an alkylene, or a bond directly to the next aromatic ring;

$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, and —PO$_3^{2-}$M$^{2+}$;

$R^4$ is H, $C_{1-10}$ alkyl, $C_{6-18}$ aryl, or $C_{6-18}$ aralkyl;

M is a metal, ammonium, or alkylammonium; and j is an integer from 1 to 30, with the proviso that when j>1, the $Y^2$ between sequential aromatic rings are the same or different and the $R^5$, $R^6$, $R^7$, $R^8$, and $R^9$ on sequential aromatic rings are the same or different;

wherein at least one of $R^5$, $R^6$, $R^7$, $R^8$, $R^9$, $R^{10}$, $R^{11}$, $R^{12}$, and $R^{13}$ is —SO$_3$H, —SO$_3^-$M$^+$, —COOH, —COO$^-$M$^+$, —PO$_3$H$_2$, —PO$_3$H$_2$M$^+$, —PO$_3^{2-}$M$_2^+$, or —PO$_3^{2-}$M$^{2+}$;

and wherein when $A_m$ and $C_p$ are both hydrophobic, A and C are each independently described by formula (4) or when $B_n$ is hydrophobic, B is described by formula (4):

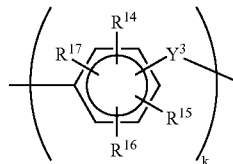
4 wherein:

$Y^3$ is —O—, —S—, —CO—, —SO$_2$—, —C(CH$_3$)$_2$—, or —C(CF$_3$)$_2$—, —PO(T$^1$)-, —C(CH$_3$)(T$^1$)-, —PO(R$^4$)—, diphenyl methylene, diphenyl silicon, fluorenyl, an alkylene, a bond directly to the next aromatic ring, or

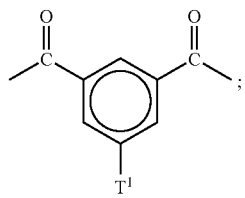

$R^{14}$, $R^{15}$, $R^{16}$, and $R^{17}$ are each independently H, $C_{1-18}$ alkyl, $C_{6-18}$ aryl, or $C_{6-18}$ aralkyl;

k is an integer from 1 to 30;

with the proviso that when k>1, the $Y^3$ between sequential aromatic rings are the same or different and the $R^{14}$, $R^{15}$, $R^{16}$, and $R^{17}$ on sequential aromatic rings are the same or different; and i is an integer from 1 to 6;

with the proviso that when i>1, the $Y^1$ between sequential aromatic rings are the same or different; the $T_1$ on sequential aromatic rings are the same or different and the $R^1$, $R^2$, and $R^3$ on sequential aromatic rings are the same or different; wherein for at least one aromatic ring in formula (2), either $T^1$ is not H or one of $R^1$, $R^2$, or $R^3$ is —SO$_3$H, —SO$_3^-$M$^+$, —COOH, —COO$^-$M$^+$, PO$_3$H$_2$, —PO$_3$H$^-$M$^+$, —PO$_3^{2-}$M$_2^+$, or —PO$_3^{2-}$M$^{2+}$, wherein formula (2) includes a $Y^1$ selected from the group consisting of —PO(T$^1$)-, and —C(CH$_3$)(T$^1$)- with $T^1$ given by formula (3).

2. The block copolymer of claim 1 wherein the first, second, and third substituents for proton transfer each independently include when present an acidic substituent or salt thereof.

3. The block copolymer of claim 1 wherein the first, second, and third substituents for proton transfer each independently include when present a component selected from the group consisting of —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, —PO$_3^{2-}$M$^{2+}$ and combinations thereof, wherein M is an alkali or alkaline-earth metal, ammonium, or alkylammonium.

4. The block copolymer of claim 3 wherein the block copolymer has a microphase separated morphology.

5. The block copolymer of claim 4 wherein the microphase separated morphology comprise spheres, cylinders, lamellae, ordered bi-continuous double diamond structures, disordered bicontinuous morphologies, and combinations thereof.

6. The block copolymer of claim 1 wherein the first block has a molecular weight from about $5 \times 10^2$ to about $5 \times 10^5$ (g/mol), the second polymer block has a molecular weight from about $5 \times 10^2$ to about $5 \times 10^5$ (g/mol), and the third polymer block has a molecular weight from about $5 \times 10^2$ to about $5 \times 10^5$ (g/mol).

7. The block copolymer of claim 1 wherein when $A_m$ and $C_p$ are both hydrophilic, A and C are each independently selected from the group consisting of polymer segments described by formula (5) and formulae (7) through (12), and salts thereof; or when $B_n$ is hydrophilic, B is selected from the group consisting of polymer segments described by formulae (5) through (16), and salts thereof:
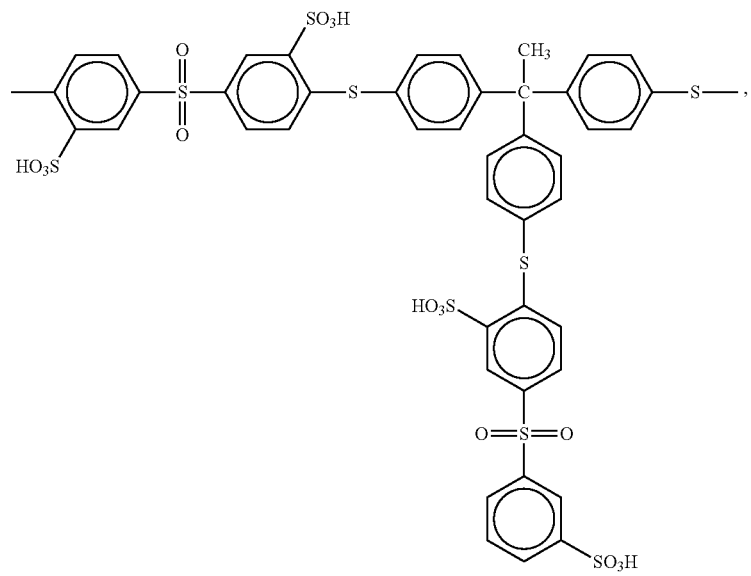
5
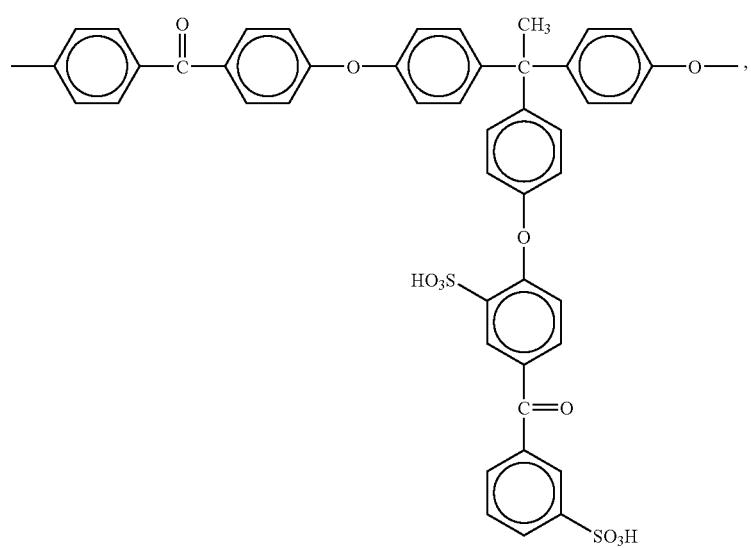
7

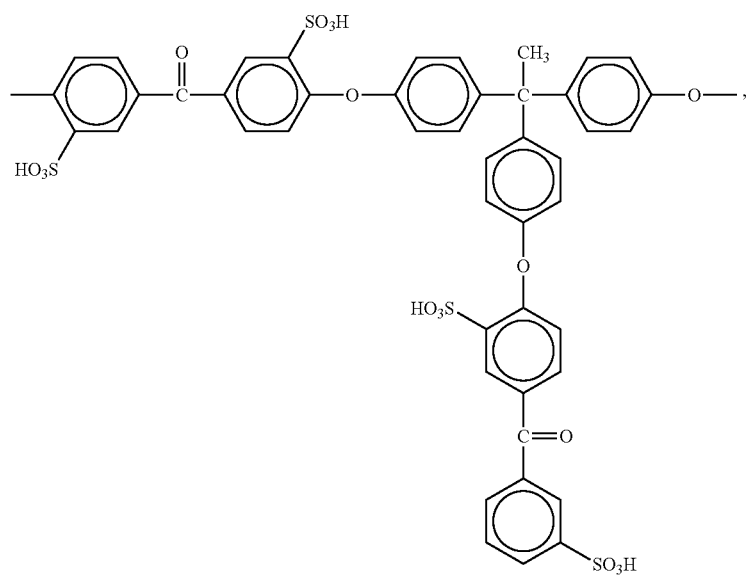
8
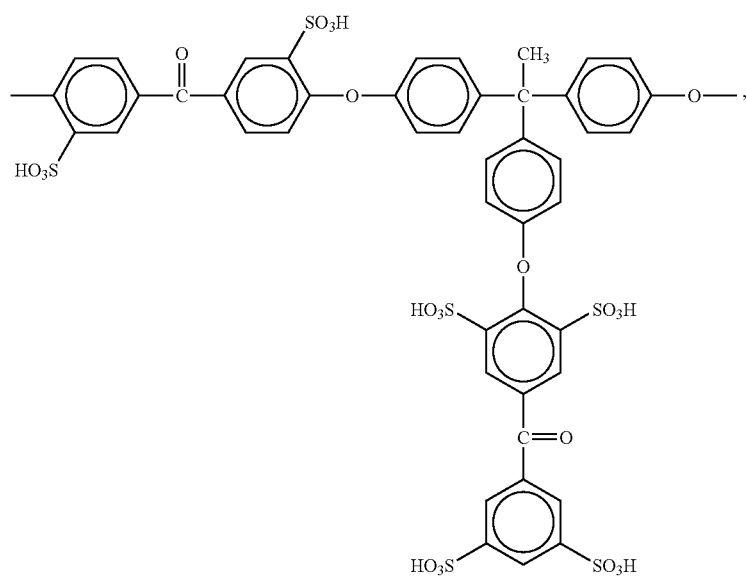
9

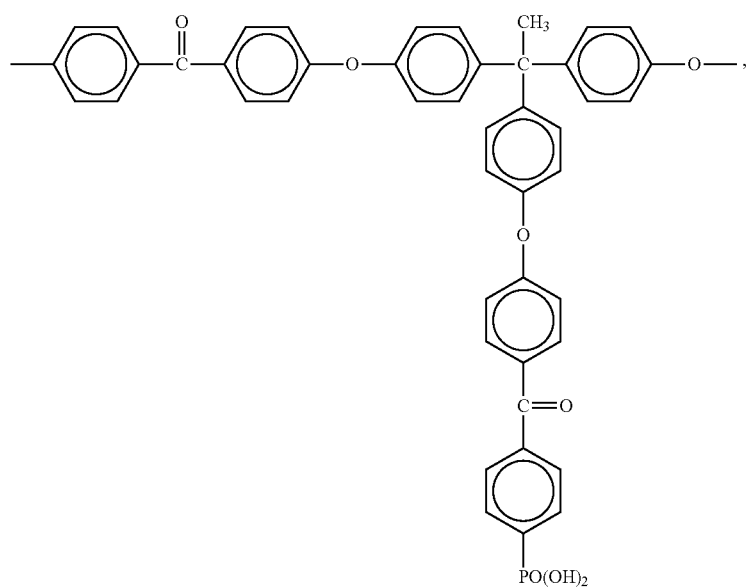
10
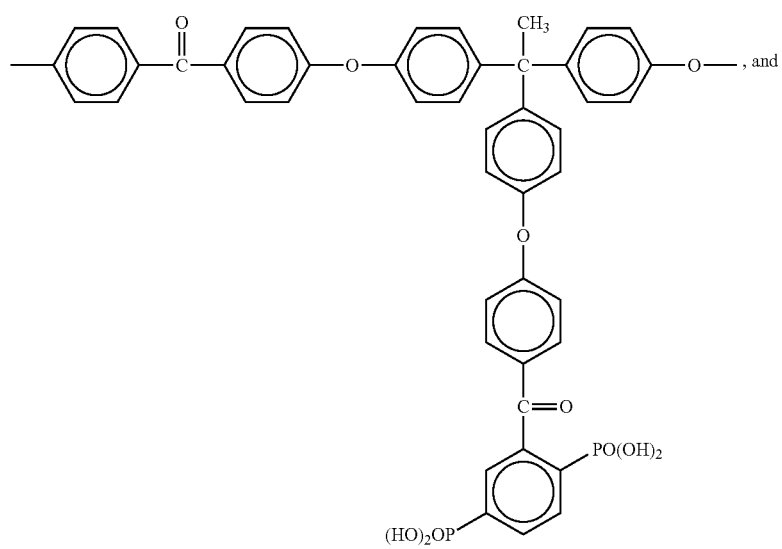
11

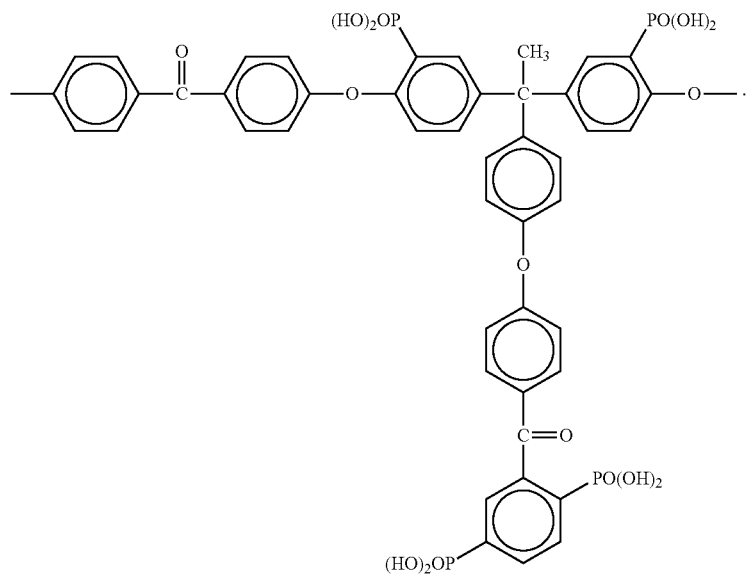
8. The block co-polymer of claim 1 wherein when $A_m$ and $C_p$ are each hydrophobic, A and C are each independently selected from the group consisting of polymer segments described by formulae (17) through (20) or when $B_n$ is hydrophobic, B is selected from the group consisting of polymer segments described by formulae (17) through (20):
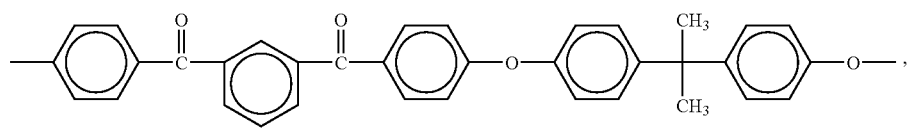
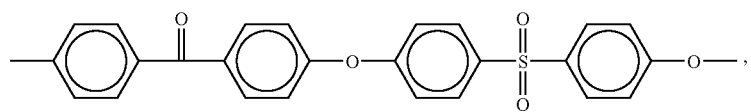
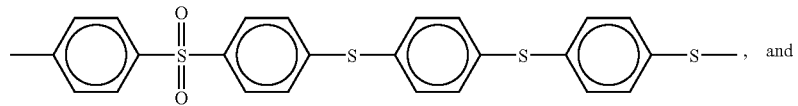
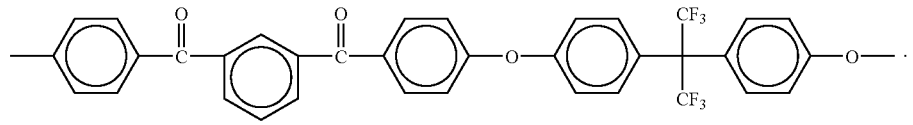

9. The block copolymer of claim 1 wherein when $A_m C_p$ are both hydrophilic, A and C are each independently selected from the group consisting of polymer segments described by formulae (5) or (6) and salts thereof; or when $B_n$ is hydrophilic, B is selected from the group consisting of polymer segments described by formulae (5) and salts thereof:

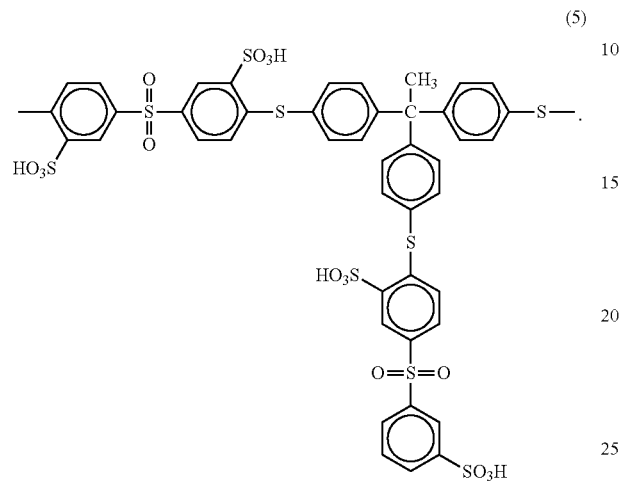

(5)

10. The block copolymer of claim 1 wherein when $A_m C_p$ are both hydrophilic, A and C are each independently selected from the group consisting of polymer segments described by formulae (10) through (15), and salts thereof; or when $B_n$ is hydrophilic, B is selected from the group consisting of polymer segments described by formulae (10) through (12), and salts thereof:

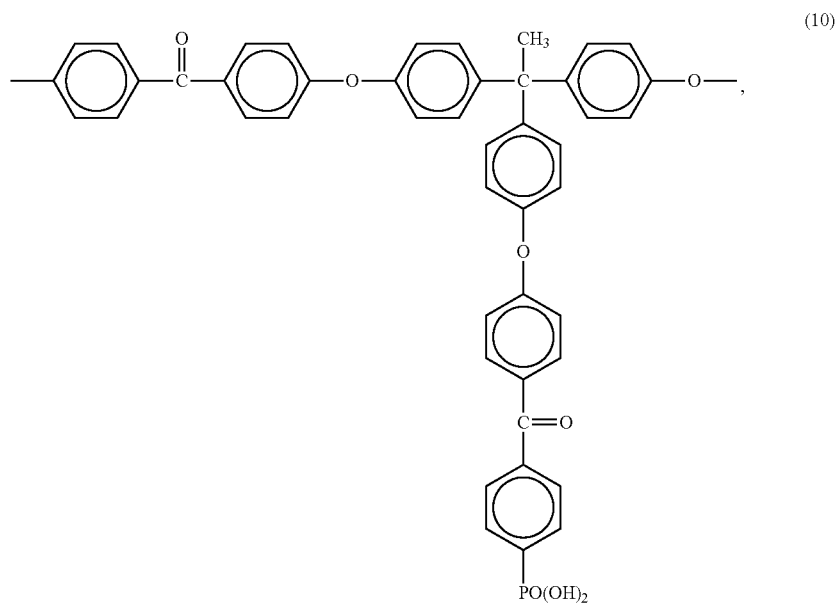

(10)

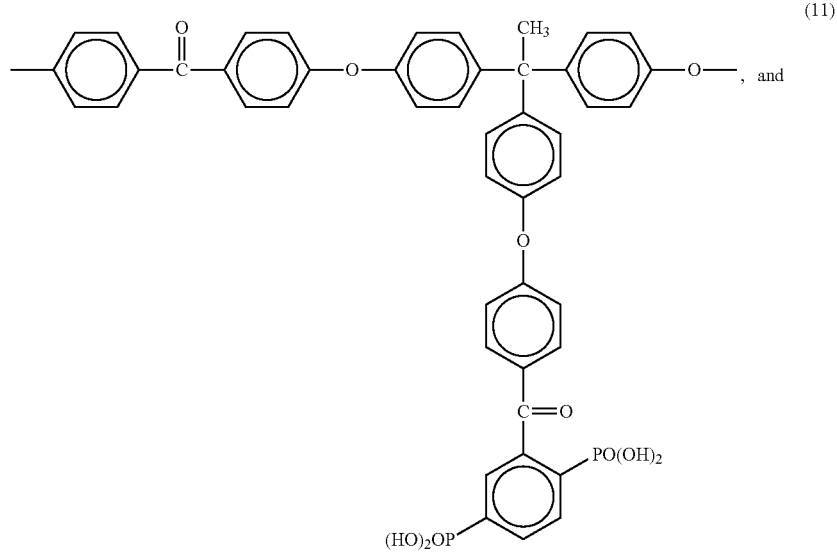

(11), and

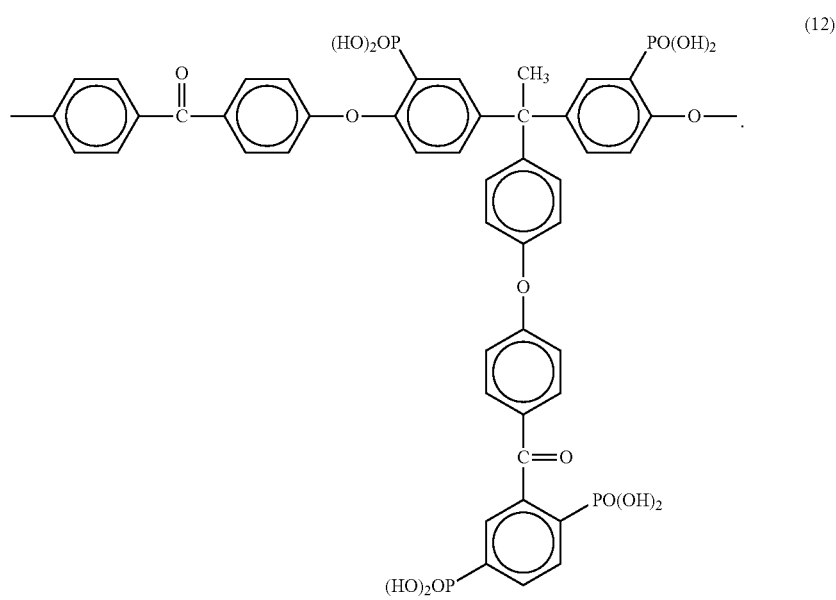

(12).

11. A block copolymer having formula (1):

$$A_m B_n C_p 1 \quad (1)$$

wherein:
A is a first polymer segment that is repeated m times to form first polymer block $A_m$ that is either hydrophobic or hydrophilic;
B is a second polymer segment that is repeated n times to form second polymer block $B_n$ that is either hydrophobic or hydrophilic;
C is a third polymer segment that repeated p times to form third polymer block $C_p$ that is either hydrophobic or hydrophilic,
m, n, and p are each independently an integer from 1 to 200;
with the proviso that when A is hydrophobic, B is hydrophilic and C is hydrophobic;
or when A is hydrophilic, B is hydrophobic and C is hydrophilic, wherein when A is hydrophilic, A comprises a first substituent for proton transfer, when B is hydrophilic, B includes a second substituent for proton transfer, and when C is hydrophilic, C includes a third substituent for proton transfer;
and wherein when $A_m$ and $C_p$ are both hydrophilic, A and C are each independently described by formula (21) and B is a hydrophobic polymer segment; or when $B_n$ is hydrophilic, B is described by formula (21) and A and C are each independently hydrophobic polymer segments:

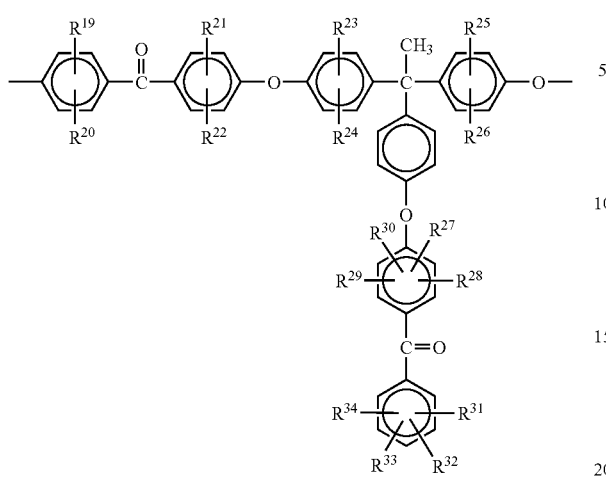

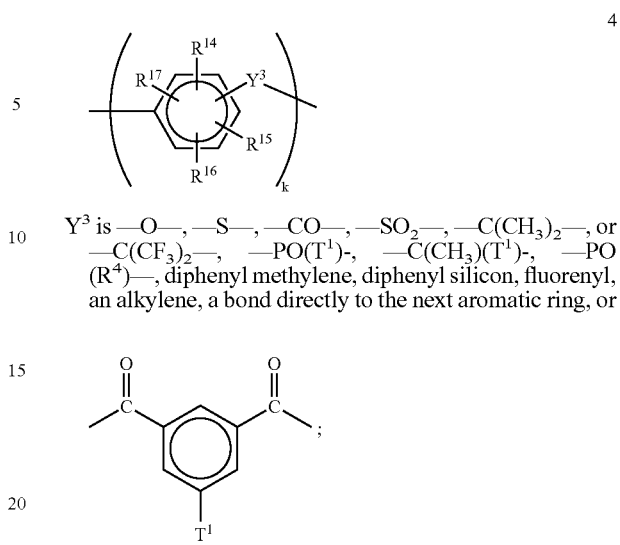

m, n, and p are each independently an integer from 1 to 200;
$R^{19}, R^{20}, R^{21}, R^{22}, R^{23}, R^{24}, R^{25}, R^{26}, R^{27}, R^{28}, R^{29}, R^{30}, R^{31}, R^{32}, R^{33}$, and $R^{34}$ are each independently H, —$SO_3H$, —$SO_3^-M^+$, —COOH, —$COO^-M^+$, —$PO_3H_2$, —$PO_3H^-M^+$, —$PO_3^{2-}M_2^+$, or —$PO_3^{2-}M^{2+}$; and
M is a metal, ammonium, or alkylammonium.

12. The block copolymer of claim 11 wherein when $A_m$ and $C_p$ are both hydrophobic, A and C are each independently described by formula (4) or when $B_n$ is hydrophobic, B is described by formula (4):

$Y^3$ is —O—, —S—, —CO—, —$SO_2$—, —$C(CH_3)_2$—, or —$C(CF_3)_2$—, —$PO(T^1)$-, —$C(CH_3)(T^1)$-, —PO($R^4$)—, diphenyl methylene, diphenyl silicon, fluorenyl, an alkylene, a bond directly to the next aromatic ring, or $T^1$ is H or a moiety having at least one substituent for proton transfer;
$R^4$ is H, $C_{1-10}$ alkyl, $C_{6-18}$ aryl, or $C_{6-18}$ aralkyl;
$R^{14}, R^{15}, R^{16}$, and $R^{17}$ are each independently H, $C_{1-18}$ alkyl, $C_{6-18}$ aryl, or $C_{6-18}$ aralkyl; and
k is an integer from about 1 to about 30;
with the proviso that when k>1, the $Y^3$ between sequential aromatic rings are the same or different and the $R^{14}, R^{15}, R^{16}$, and $R^{17}$ on sequential aromatic rings are the same or different.

* * * * *